United States Patent [19]
McMills et al.

[11] Patent Number: 5,286,952
[45] Date of Patent: Feb. 15, 1994

[54] METHODS AND DEVICES WHICH MAKE USE OF CONDUCTIVE POLYMERS TO JOIN ARTICLES

[75] Inventors: Corey J. McMills, Los Altos; John R. Hughes, Atherton, both of Calif.; Hans Cordia, Pellenberg, Belgium; Johann D'Hondt, Hong Kong, Hong Kong; John A. Ross, Fremont, Calif.; Jeffrey A. Sampson, Redwood City, Calif.; Pradeep Barma, Fremont, Calif.; Barry Mathews, San Jose, Calif.; Robert Ritter, Fremont, Calif.; Julian S. Mullaney, Raleigh, N.C.

[73] Assignee: Raychem Corporation, Menlo Park, Calif.

[21] Appl. No.: 629,757

[22] Filed: Dec. 18, 1990

Related U.S. Application Data

[63] Continuation-in-part of Ser. No. 407,595, Sep. 15, 1989, Ser. No. 597,300, Oct. 12, 1990, and Ser. No. 299,915, Oct. 21, 1988, said Ser. No. 407,595, is a continuation of Ser. No. 210,054, Jun. 22, 1988, abandoned, which is a continuation-in-part of Ser. No. 61,259, Jun. 11, 1987, abandoned, Ser. No. 61,354, Jun. 11, 1987, abandoned, and Ser. No. 120,883, Nov. 16, 1987, abandoned, said Ser. No. 597,300, is a continuation of Ser. No. 428,487, Oct. 31, 1989, abandoned, which is a continuation of Ser. No. 249,733, Sep. 26, 1988, abandoned, which is a continuation-in-part of Ser. No. 61,259, Sep. 26, 1988.

[51] Int. Cl.⁵ .................. H05B 3/58; H05B 3/34; B32B 17/00; B32B 31/00
[52] U.S. Cl. .................. 219/535; 219/549; 219/553; 219/528; 156/105
[58] Field of Search ............ 219/548, 549, 541, 553, 219/535, 528, 542, 544, 505, 504, 543; 156/83, 218, 273, 9, 293; 264/27, 36, 105

[56] References Cited

U.S. PATENT DOCUMENTS

| | | | |
|---|---|---|---|
| 2,282,832 | 5/1942 | Spooner | 201/76 |
| 2,388,297 | 11/1945 | Slaughter | 154/42 |

(List continued on next page.)

FOREIGN PATENT DOCUMENTS

| | | |
|---|---|---|
| 123540 | 4/1984 | European Pat. Off. . |
| 157640 | 10/1985 | European Pat. Off. . |
| 251482 | 5/1987 | European Pat. Off. . |
| 1374690 | 8/1964 | France . |
| 62-48747 | of 0000 | Japan . |
| 51-84866 | 7/1976 | Japan . |
| 53-147732 | 12/1978 | Japan . |
| 56-16115 | 12/1981 | Japan . |
| 58-164627 | 9/1983 | Japan . |
| 1213126 | 9/1986 | Japan . |
| 62-288029 | 12/1987 | Japan . |
| WO88/06517 | 9/1988 | PCT Int'l Appl. . |
| 1010197 | 11/1965 | United Kingdom . |
| 1059523 | 2/1967 | United Kingdom . |
| 1155470 | 6/1968 | United Kingdom . |
| 1265194 | 3/1972 | United Kingdom . |
| 2065430A | 6/1981 | United Kingdom . |
| WO80/02124 | 10/1980 | World Int. Prop. O. . |

OTHER PUBLICATIONS

Coughlan et al, "Ultrahigh Molecular Weight Polyethylene", Encyclopedia Polymer Science and Engineering, 2d, vol. 6, pp. 490–494 (1986).

*Primary Examiner*—Bruce A. Reynolds
*Assistant Examiner*—Michael D. Switzer
*Attorney, Agent, or Firm*—Herbert G. Burkard; Timothy H. P. Richardson

[57] ABSTRACT

Articles including a thin laminar heating element composed of a sintered conductive polymer, and electrodes attached to the heating element so that current flows in the plane of the element. The article can be placed between and in contact with two substrates, and then heated to join the two substrates together. Preferably at least one of the substrates is polymeric and becomes melt-fused to the article.

13 Claims, 9 Drawing Sheets

U.S. PATENT DOCUMENTS

| | | | |
|---|---|---|---|
| 2,739,829 | 8/1950 | Pedlow et al. | 285/115 |
| 2,930,634 | 3/1960 | Merritt | 285/21 |
| 2,992,457 | 7/1961 | Harrison | 18/59 |
| 3,049,465 | 8/1962 | Wilkins | 156/272 |
| 3,340,328 | 9/1967 | Brindell et al. | 260/897 |
| 3,359,524 | 12/1967 | Gallacher et al. | 338/212 |
| 3,406,055 | 5/1965 | Rubel | 156/275 |
| 3,506,519 | 4/1970 | Blumenkranz | 156/275 |
| 3,528,867 | 9/1970 | Leatherman et al. | 156/272 |
| 3,542,402 | 11/1970 | Caples et al. | 285/21 |
| 3,609,104 | 9/1971 | Ehrreich et al. | 252/511 |
| 3,706,176 | 12/1972 | Leatherman | 53/42 |
| 3,891,490 | 6/1975 | Humphries | 156/295 |
| 3,927,233 | 12/1975 | Naidoff | 428/58 |
| 3,987,276 | 10/1976 | Vogelsanger et al. | 219/535 |
| 3,991,243 | 11/1976 | Biddell | 428/61 |
| 4,025,600 | 5/1977 | Parr | 264/262 |
| 4,051,454 | 9/1977 | Leiser et al. | 338/328 |
| 4,055,615 | 10/1977 | Ikeda | 264/105 |
| 4,067,765 | 1/1978 | Heller, Jr. et al. | 156/272 |
| 4,085,286 | 4/1978 | Horsma et al. | 174/92 |
| 4,090,899 | 5/1978 | Reich | 156/79 |
| 4,110,145 | 8/1978 | Lombardi | 156/218 |
| 4,151,126 | 4/1979 | Adelman et al. | 252/508 |
| 4,151,364 | 4/1979 | Ellis | 174/84 |
| 4,177,376 | 12/1979 | Horsma et al. | 219/553 |
| 4,177,446 | 12/1979 | Diaz | 338/212 |
| 4,318,220 | 3/1992 | Diaz | 29/611 |
| 4,330,703 | 5/1982 | Horsma et al. | 219/553 |
| 4,330,704 | 5/1982 | Jensen | 219/553 |
| 4,362,684 | 12/1982 | Thalmann | 264/230 |
| 4,378,323 | 3/1983 | Brandeau | 264/27 |
| 4,421,582 | 12/1983 | Horsma et al. | 156/86 |
| 4,455,482 | 6/1984 | Grandclement | 219/551 |
| 4,485,297 | 11/1984 | Grise et al. | 219/528 |
| 4,502,929 | 3/1985 | Stewart et al. | 204/147 |
| 4,518,552 | 5/1985 | Matsuo et al. | 264/26 |
| 4,532,099 | 7/1985 | Kaji | 264/510 |
| 4,548,662 | 10/1985 | Chazan et al. | 156/86 |
| 4,570,055 | 2/1985 | McMills | 219/541 |
| 4,575,432 | 3/1986 | Lin et al. | 252/511 |
| 4,575,617 | 3/1986 | Cooper | 219/494 |
| 4,618,168 | 10/1986 | Thalmann et al. | 156/273.9 |
| 4,624,487 | 11/1986 | Thalmann | 285/197 |
| 4,659,912 | 4/1987 | Derbyshire | 219/535 |
| 4,670,078 | 6/1987 | Thalmann et al. | 156/274.2 |
| 4,675,512 | 6/1987 | Doucet et al. | 219/535 |
| 4,695,335 | 9/1987 | Lyall | 156/64 |
| 4,729,809 | 3/1988 | Dery et al. | 156/306 |
| 4,731,199 | 3/1988 | Matsuo et al. | 252/511 |
| 4,775,501 | 10/1988 | Rosenzweig et al. | 264/27 |

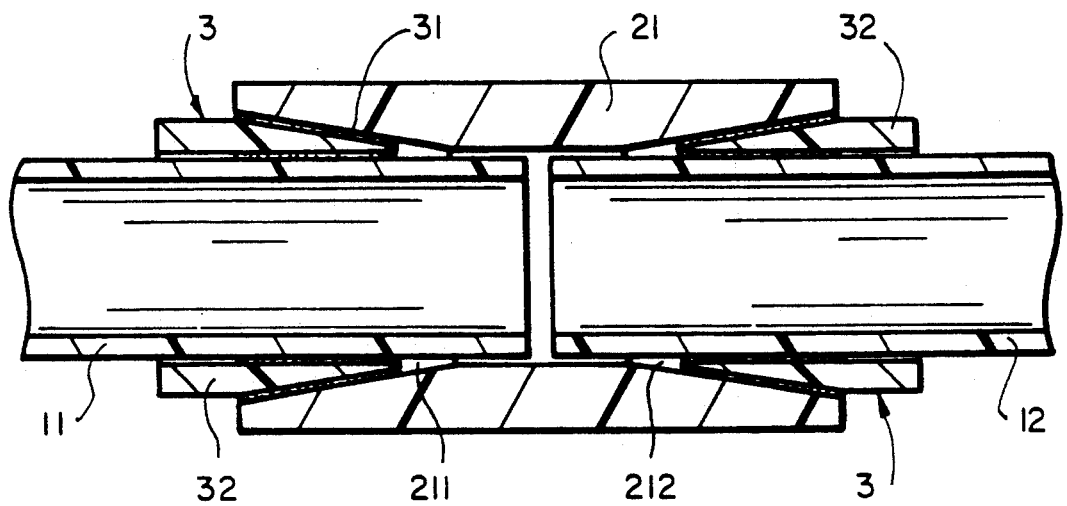
FIG_1
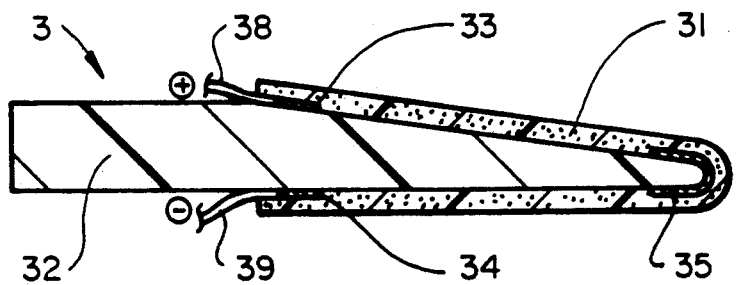
FIG_2
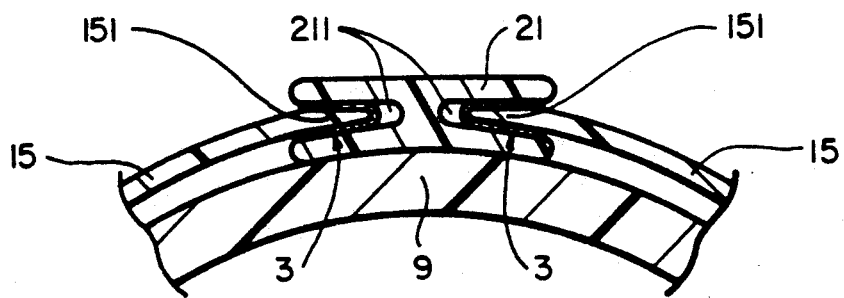
FIG_3

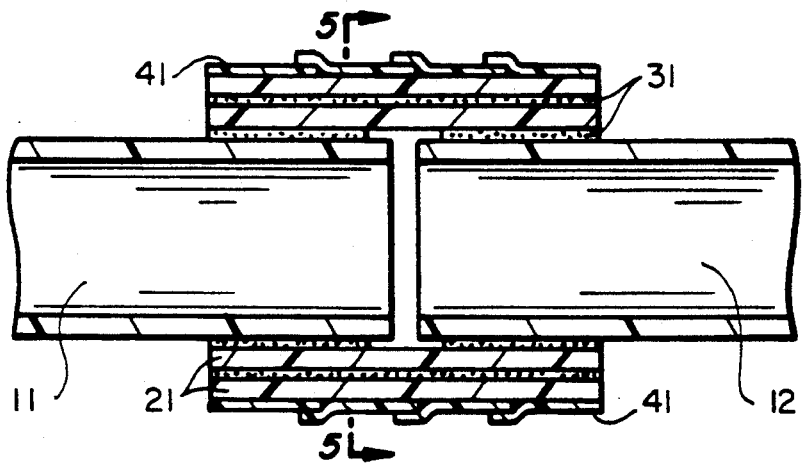
FIG_4
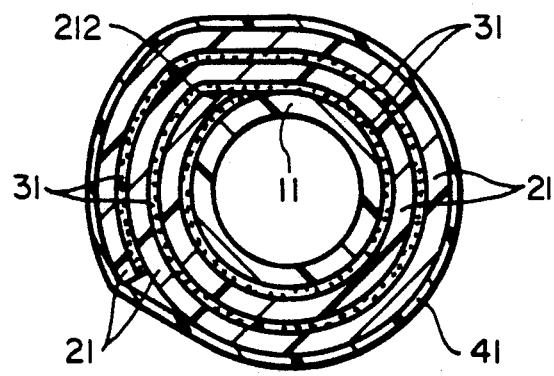
FIG_5
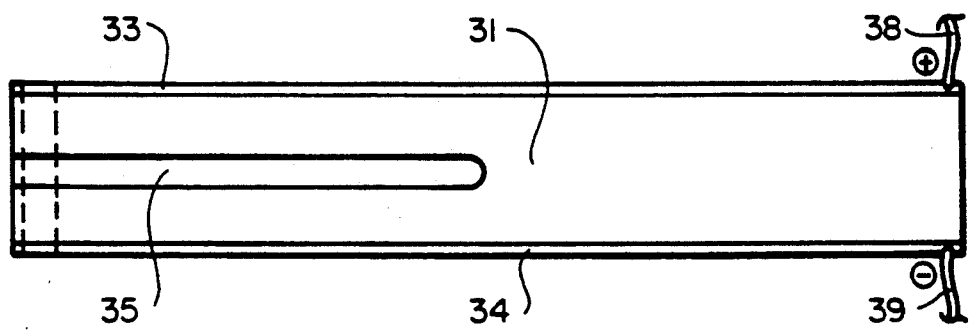
FIG_6

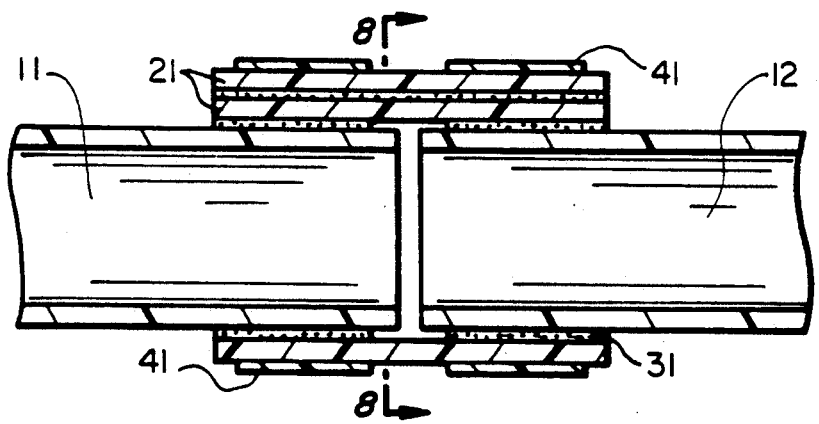
FIG_7
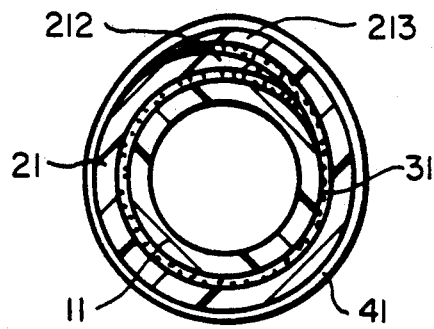
FIG_8
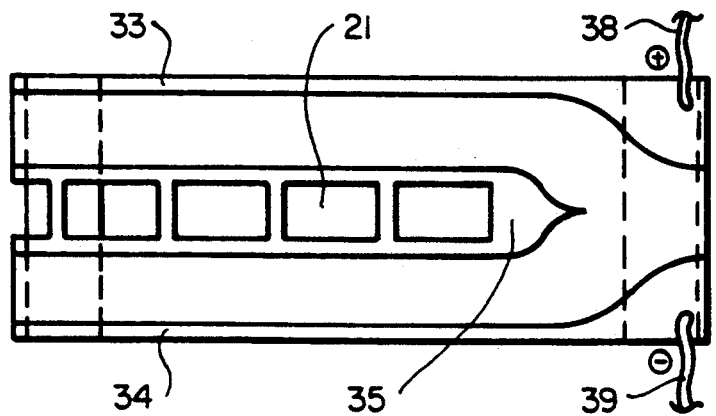
FIG_9

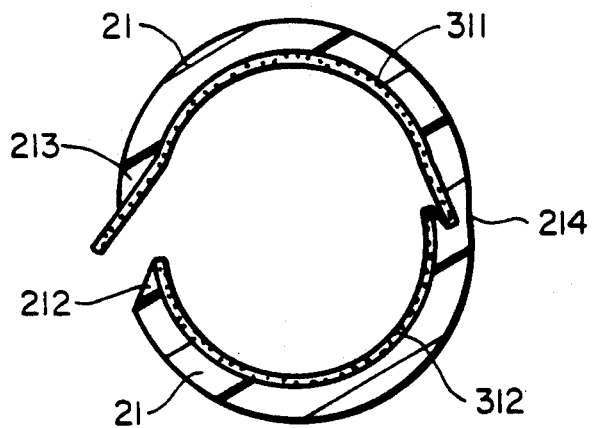
FIG_10
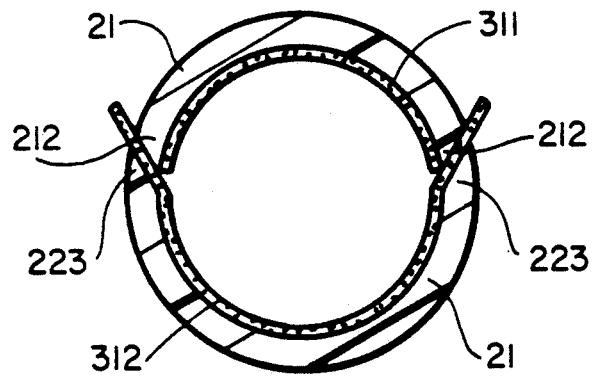
FIG_11
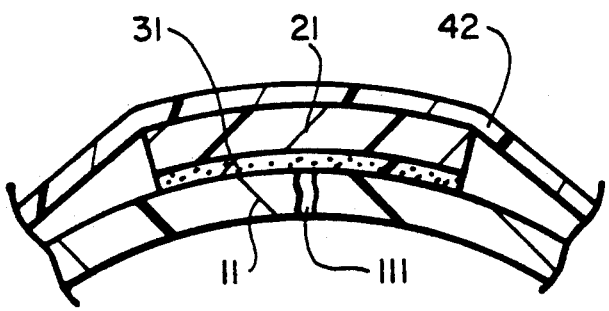
FIG_12

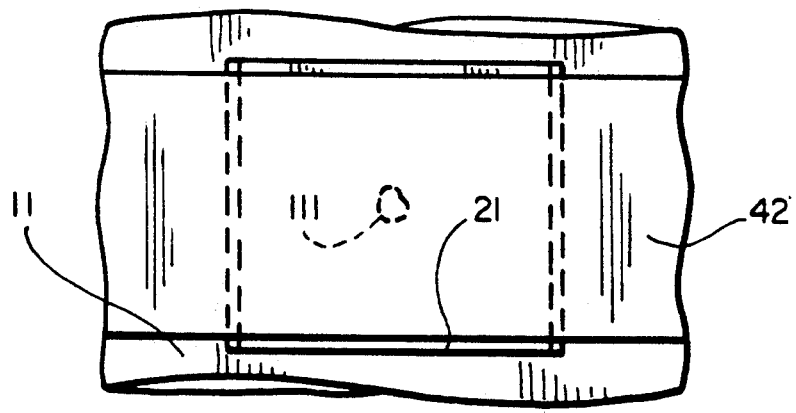
FIG_13
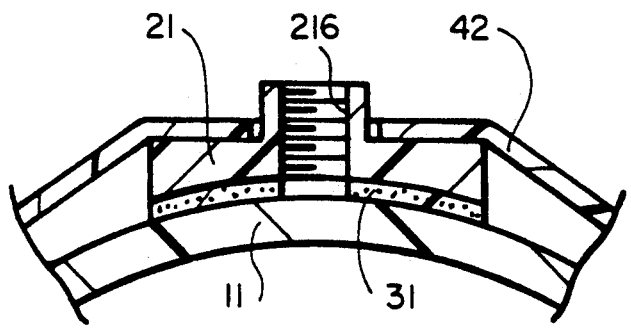
FIG_14
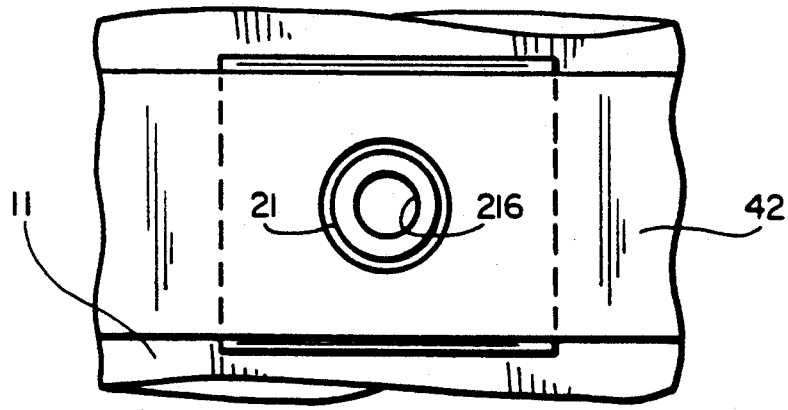
FIG_15

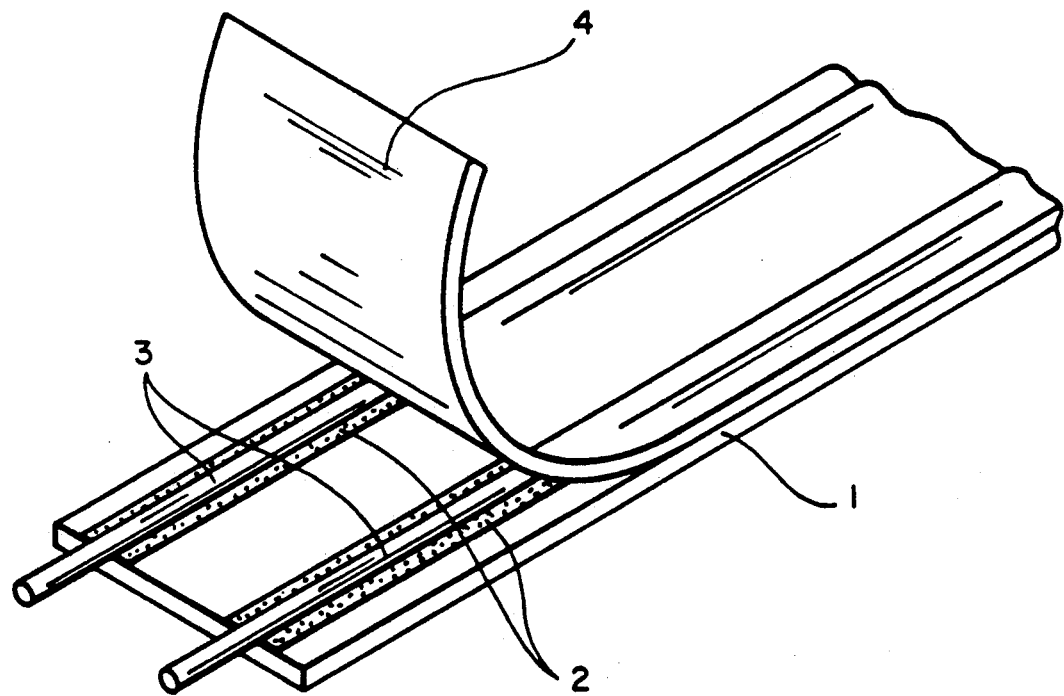
FIG_16
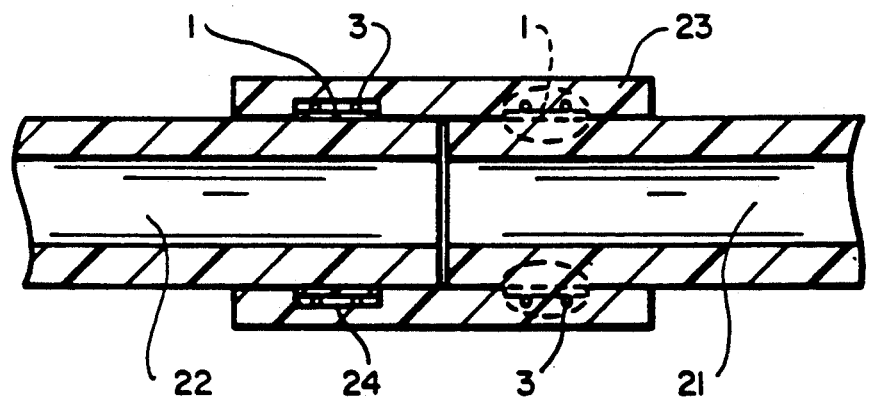
FIG_17

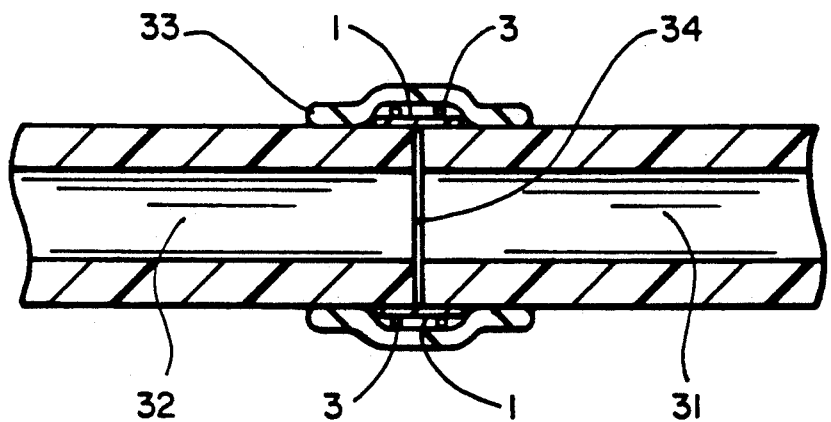
FIG_18
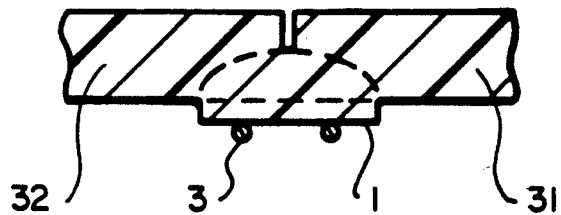
FIG_19

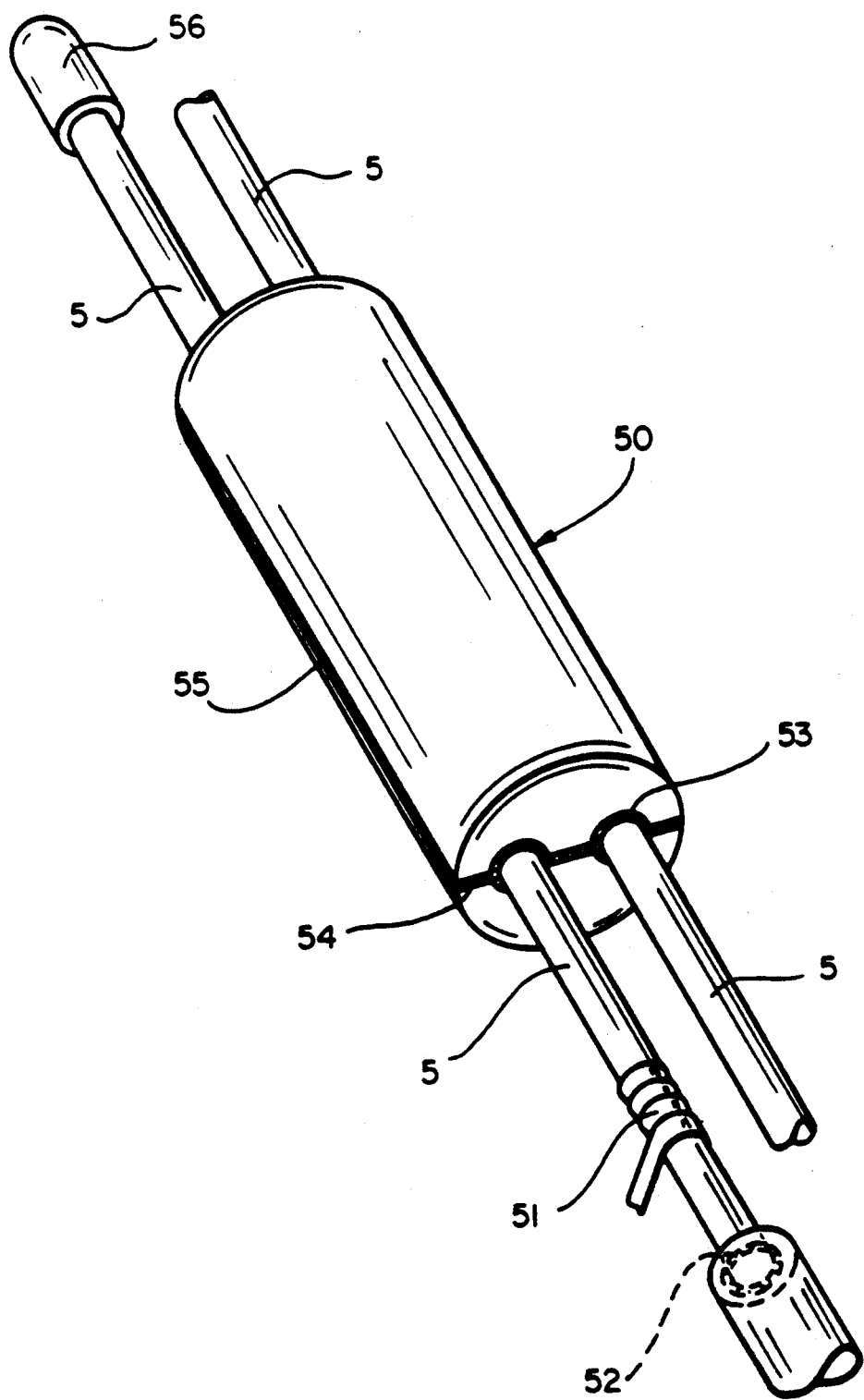
FIG_20

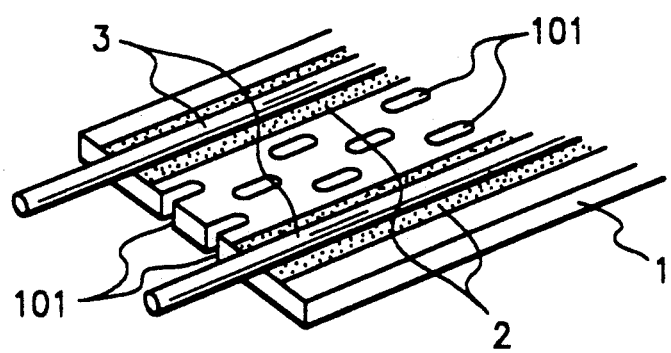
FIG_21

METHODS AND DEVICES WHICH MAKE USE OF CONDUCTIVE POLYMERS TO JOIN ARTICLES

CROSS-REFERENCE TO RELATED APPLICATIONS

This application is a continuation-in-part of (1) Copending, commonly assigned, application Ser. No. 07/407,595, which was filed on Sep. 15, 1989, by Corey J. McMills, John R. Hughes, Hans Cordia and Johann D'Hondt Ser. No. 07/407,595 is a file wrapper continuation of Ser. No. 07/210,054 filed Jun. 22, 1988 and now abandoned; Ser. No. 07/210,054 is a continuation-in-part of (a) Ser. No. 07/061,259, which was filed by Corey J. McMills and John A. Ross on Jun. 11, 1987 and is now abandoned.

(b) Ser. No. 07/61354, which was filed on Jun. 11, 1987, by Corey J. McMills, and was abandoned in favor of a file wrapper continuation, Ser. No. 07/394,288 filed Aug. 15, 1989, now U.S. Pat. No. 4,938,820;

(c) Ser. No. 07/120,883, which was filed on Nov. 16, 1987, by Pradeep Barma, Barry Mathews, Corey J. McMills and Robert Ritter and was now abandoned on Aug. 25, 1988; and (d) International Application No. PCT/US88/00592, which was filed on Feb. 24, 1988, in the United States Receiving Office, designating U.S. (and other countries), naming Corey J. McMills, John A. Ross, Jeffrey A. Sampson, Pradeep Barina, Barry Mathews, Robert Ritter, and Julian S. Mullaney as inventors and applicants for U.S., and requesting (for U.S.) treatment as a continuation part of (i) U.S. application Ser. No. 17,497, which was filed on Feb. 24, 1987, by Corey J. McMills and was abandoned on Apr. 14, 1988, (ii) U.S. application Ser. No. 07/61259 as identified above, (iii) U.S. application Ser. No. 07/61354 as identified above, and (iv) U.S. application Ser. No. 07/120,883 as identified above.

(2) Copending commonly assigned U.S. application Ser. No. 07/597,300 which was filed on Oct. 12, 1990, by Corey J. McMills and John A. Ross; Ser. No. 07/597,300 is a file wrapper continuation of Ser. No. 07/428,487 filed Oct. 31, 1989, and now abandoned; Ser. No. 07/428,487 is a file wrapper continuation of Ser. No. 07/249,733 filed Sep. 26, 1988, and now abandoned; Ser. No. 07/249,733 is a continuation-in-part of Ser. No. 07/061,259 filed Jun. 11, 1987, by Corey J. McMills and John A. Ross and now abandoned. Each of Ser. Nos. 07/597,300, 07/428,487, 07/249,733 and 07/061,259 incorporates by reference the disclosure of Ser. No. 07/017,497 filed Feb. 24, 1987.

(3) Copending commonly assigned application Ser. No. 07/299,915, which was filed on Oct. 21, 1988 by Corey J. McMills, John A. Ross, Jeffrey A. Sampson, Pradeep Barma, Barry Mathews, Robert Ritter, and Julian S. Mullaney Ser. No. 07/299,915 is a U.S. National Application derived from International Patent Application No. PCT/US88/00592 as further identified in (1) above.

The disclosure of each of the United States and International Patent Applications identified above is incorporated herein by reference for all purposes.

BACKGROUND OF THE INVENTION

1. Field of the Invention

This invention relates to methods of joining articles together with the aid of conductive polymer components, and to novel articles for use in such methods.

2. Prior Art

Conductive polymers are well known. They comprise a polymeric component and, dispersed or otherwise distributed therein, a particulate conductive filler, e.g. carbon black. Conductive polymers have been widely used in electrical heaters, including heaters which are in the form of heat-recoverable articles or which are secured to heat-recoverable articles so that, by powering the heater, the article can be caused to recover. Typically, the recovery of the article results in joining, repairing, reinforcing or otherwise modifying one or more substrates around or against which the article recovers. Recently, it has been shown that conductive polymers which retain substantial strength above their melting point, especially sintered polymers such as ultra high molecular weight polyethylene (UHMWPE), are particularly useful for modifying pipes composed of organic polymers (plastic pipes). Reference may be made for example to U.S. Pat. Nos. 3,987,276, 4,085,286, 4,177,376, 4,177,446, 4,421,582, 4,455,482, 4,570,055, 4,575,618, 4,686,071, U.K. Patent Nos. 1,265,194, 1,449,539, and 2,124,439, German Patent Application No. 3,442,674, U.S. patent application Ser. Nos. 596,761, now abandoned, published as European application No. 157,640, 582,105, now abandoned, published as European application No. 153,199, and 818,845, now abandoned, published as European application No. 231,068, and copending commonly assigned U.S. patent application Ser. Nos. 720,117 (MP0922) filed Apr. 2, 1985, 720,118 (MP1039) filed Apr. 2, 1985, 784,288 (MP1086) filed Oct. 4, 1985, 818,846 (MP1100) filed Jan. 14, 1986, 853,805 (KP1117) filed, Apr. 18, 1986, 867,830 (MP1130) filed May 27, 1986, 17,497 (MP1180) filed Feb. 23, 1987, 61,353 (MP1186) filed Jun. 11, 1987, 61,354 (MP1187) filed Jun. 11, 1987, 61,259 (MP1202) filed Jun. 11, 1987, 67,679 (MP922) filed Jun. 26, 1987, 75,929 (MP1095) filed Jul. 21, 1987, 89,389 (KP1130) filed Aug. 25, 1987, 120,883 (HP1231) filed Nov. 16, 1987, 132,698 (MP0907) filed Dec. 14, 1987, and 164,046 filed Mar. 4, 1988). The disclosures of each of the patents and patent applications referred to above are incorporated herein by reference.

SUMMARY OF THE INVENTION

This invention includes within its scope the various methods, devices, articles and tapes which are disclosed and claimed in International Application No. PCT/US 88/00592 and U.S. Ser. Nos. 17,497, 61,259, 61,354 and 120,883 incorporated by reference herein. The invention is particularly useful for joining one polymeric pipe to another polymeric pipe or to a metal pipe, via a polymeric coupler which fits over the end of the pipes, and for modifying a polymeric pipe by joining another polymeric article (e.g. a repair patch) to it. However, the invention is also useful in a wide variety of other situations.

In its first aspect, the present invention provides a method of joining a first article and a second article, which method comprises (1) placing a first surface of the first article adjacent to a second surface of the second article so that the surfaces define a recess between them;

(2) placing in the recess at least part of a gasket which
  (a) comprises a conductive polymer
  (b) has a third surface which is placed adjacent to the first surface, and
  (c) has a fourth surface which is placed adjacent to the second surface;
(3) moving at least one of the gasket and the first and second articles relative to each other so that there is intimate contact between the first and third surfaces and between the second and fourth surfaces; and
(4) generating heat within the conductive polymer, preferably by passing electrical current through it, while maintaining intimate contact of the surfaces, so as to join the first and second articles.

In this method, a variety of procedures are available for carrying out steps (1) and (2). For example, the first and second articles can be placed adjacent to each other, and the gasket then placed in the recess between them; or the gasket can be placed adjacent to the first or the second article, and the other article then placed adjacent to the gasket; or the gasket can be joined to the first or the second article and the other article then placed adjacent to the gasket. In the latter case, the gasket can be joined to the first or second article in situ, or the gasket and the article can be preassembled, e.g. at a manufacturing site. If the gasket and the article are preassembled, the join between them can be one which remains unchanged during steps (3) and (4) of the method or one which is modified during one or both of steps (3) and (4). In describing those aspects of the invention in which a gasket is joined to one of the articles before the other article is placed adjacent to the gasket, the article to which the gasket is joined is generally referred to as the second article. It should be understood, however, that this is merely for clarity, and that such description is also applicable, where appropriate, to systems and methods in which the gasket is prejoined to the first article.

By way of example, in one of several preferred embodiments of the method of the invention, two pipes are joined together in line by means of a cylindrical coupler which fits around the pipe ends, leaving a recess between the coupler and each pipe end. In this embodiment, each of the pipes can be regarded as a "first article" in the method defined above and the coupler can be regarded as a "second article". Two gaskets are, therefore, used, one at each end of the coupler. The joining of the pipes to the coupler can be carried out simultaneously or at different times.

The term "intimate contact" is used herein to denote a sufficiently close conformity between the surfaces to ensure that when the heat is generated within the conductive polymer, the heat serves its intended purpose of joining the first and second articles together and does not cause any substantial damage to the first or the second article or to the gasket. If there are voids present at the various interfaces, they can result in overheating which is wasteful and can be damaging, particularly when the rate at which power is generated is high.

The term "joining" is used herein to include an improvement in an existing join, for example by fusing together surfaces which are already joined together in some other way or by completing fusion between surfaces which are already fused together at spaced-apart locations. The join between the articles is preferably gas-tight and liquid-tight, and is preferably such that in an appropriate physical test, e.g. a flex, tension, torsion, or burst test, one of the articles fails before the join.

As will be described in detail below, the joining of the first and second articles can be achieved in a variety of different ways. Preferably, the third and fourth surfaces of the gasket are provided by a conductive polymer and, as a result of the heating, become fused to the first and second surfaces respectively. Alternatively or additionally, the gasket can have apertures therein and, as a result of the heating, the first and second surfaces become fused directly to each other through the apertures. The gasket can consist essentially of a conductive polymer element (usually a laminar element), together with any electrodes or other conductive elements which are used to ensure the desired generation of heat therein. In another embodiment, the gasket includes a central member, e.g. a strip of an insulating polymeric material, and one or more conductive polymer elements are attached to the sides of the central member to provide the third and fourth surfaces.

The term "fusion" is used herein to denote a process in which two polymeric substrates are joined directly to each other with the aid of heat, and there is sufficient molecular compatibility between the substrates that, under the conditions of the process, molecular diffusion takes place across the interface between the substrates and/or there is viscoelastic contact between the substrates as defined by J. N. Anand in Adhesion 1 (1969), 16-23 and Adhesion 2 (1970) 16-22. The fusion process preferably results in a bond which has a mechanical performance which is superior to that of at least one of the substrates. The surfaces of the substrates which have undergone fusion are said to be "fused" together. The method of the invention is particularly useful when the first and second articles (A) are composed of polymeric compositions which are the same or in which at least 80%, preferably at least 90%, especially substantially 100%, of the repeating units of the polymer are the same, and (B) are joined together by (i) fusion to opposite sides of a laminar conductive polymer element comprising a polymeric component in which at least 80%, preferably at least 90%, especially substantially 100%, of the repeating units are the same as in the first and second articles, or (ii) by fusion to one or more laminar conductive polymer elements, each of which comprises a polymeric component as just defined and each of which is fused to (or in the course of the method becomes fused to) a central member composed of an insulating polymeric composition in which at least 80%, preferably at least 90%, especially substantially 100%, of the repeating units of the polymer are the same as in the first and second articles. The preferred polymer in each of the components is polyethylene. The polyethylenes in the different components need not be, indeed usually will not be, the same. For example two pipes composed of melt-extruded low, medium or high density polyethylene can be joined together with a coupler which is composed of the same or a different melt-extruded low, medium or high density polyethylene, by means of a gasket which (a) comprises a conductive polymer based on a sintered ultra high molecular weight polyethylene, and (b) optionally comprises a central member which is composed of a melt-extruded low, medium or high density polyethylene.

In most cases, each of the first and second articles is substantially thicker than at least a part of the gasket. For example, the thickness of each of the articles may be from 0.05 to 6.0 inch, preferably 0.1 to 2.0 inch, and will not usually differ by a factor of more than 5, preferably not more than 3, whereas the gasket will usually be no more than 0.15 inch, preferably no more than 0.05 inch, thick when the articles are fused to opposite faces of the conductive polymer element, and no more than about 0.4 inch, often decreasing to no more than about 0.1 inch, when the gasket comprises a central member.

Especially when one (or both) of the surfaces to be joined is composed of a non-polymeric material, e.g. is composed of concrete or a metal, or when there is insufficient compatibility between the polymeric materials to allow fusion to take place, e.g. where one or both is composed of a thermoset material, e.g. an epoxy or other resin reinforced with glass fibers, an insert can be placed between the surfaces to be joined, the insert being such that, when heated by the conductive polymer, it undergoes a physical or chemical change which joins the surfaces together. Thus the insert can for example be composed of a partially cured thermosetting resin or a hot-melt adhesive (including a sheet of a polymer which is sufficiently compatible to become fused to each of the surfaces). The insert can be secured to the gasket or to the article before the gasket and the two articles are assembled, or it can be inserted in situ. For example, a sheet of polyethylene or another insulating polymeric material can be secured to one or both faces of the conductive polymer element. When the first and second surfaces are compatible with each other, the gasket can have apertures therein so that the first and second surfaces can be fused directly to each other through the apertures. Such direct fusion can be in addition to fusion or other form of bonding between the first and third surfaces and between the second and fourth surfaces in developing the method summarized above, we have also developed a variety of novel articles which are useful in the method and which form part of the present invention.

In a second aspect, the present invention provides novel articles which are useful in a process as defined above as a combined second article and gasket, and which comprise (1) a flexible tape composed of an insulating composition comprising an organic polymer, and (2) a laminar gasket which is secured to the tape and which comprises a laminar heater comprising
  (a) a laminar resistive heating element which is composed of a conductive polymer composition, and
  (b) electrodes which can be connected to a source of electrical power to cause current to pass through the resistive element.

In a third aspect, the present invention provides further novel articles which are useful in the process defined above as a combined second article and gasket and which comprise (1) an articulated article comprising at least two component members, each of which is joined to at least one other component member through a joint, and each of which is composed of an insulating composition comprising an organic polymer, and (2) a laminar gasket which is secured to said article and which comprises a laminar heater comprising
  (a) a laminar resistive heating element which is composed of a conductive polymer composition, and
  (b) electrodes which can be connected to a source of electrical power to cause current to pass through the resistive element.

In a fourth aspect, the invention provides novel kits of parts which can be assembled into a composite article for use as a combined second article and gasket in the process defined above, said kit of parts comprising a plurality of composite components, each of which comprises a second article and a laminar gasket which is secured thereto and which comprises a laminar heater comprising
  (a) a laminar resistive heating element which is composed of a conductive polymer composition, and
  (b) electrodes which can be connected to a source of electrical power to cause current to pass through the resistive element;

the composite components being such that they can be assembled adjacent to the first article to form a composite article which comprises
  (i) shell-forming surfaces of the second articles which together have a shape corresponding to the first article,
  (ii) abutting surfaces of the second articles which are adjacent to each other and form junctions between the second articles,
  (iii) at least one gasket between the shell-forming surfaces and the first article, and
  (iv) at least one gasket between the abutting surfaces at each junction.

In a fifth aspect, this invention provides an article which is suitable for use as a gasket in the first aspect of the invention, and for other purposes, eg. as a heater, said article being one which is not heat-recoverable and which comprises:

(a) an element which (1) is in the form of a tape which has a ratio of external surface area to polymer volume of at least 40 $in^2/in^3$ and (2) is composed of a conductive polymer which
  (i) comprises a sintered polymeric component which is composed of polyethylene, polyphenylenesulfide, polyetherether ketone, polyaryleneetherketone, polyimide, or polyvinylidene fluoride, and, distributed in the polymeric component, a conductive particulate filler, and
  (ii) increases in volume by at least 10% when it is heated from 23° C. to the melting point of at least part of the polymeric component, and (b) electrodes which can be connected to a source of electrical power and which, when so connected, cause current to flow through the conductive polymer element.

In a sixth aspect, this invention provides an article which is suitable for use as gasket in the first aspect of the invention, and for other purposes, said article being one which comprises (a) an element which (1) is in the form of a tape which has a ratio of external surface area to polymer volume of at least 40 $in^2/in^3$ and (2) is composed of a conductive polymer which comprises a sintered polymeric component which is composed of polyethylene, polyphenylenesulfide, a polyetherether ketone, a polyarlyeneetherketone, a polyimide, or polyvinylidene fluoride, and, distributed in the polymeric component, a conductive particulate filler, and (b) Electrodes which can be connected to a source of electrical power and which, when so connected, cause current to flow through the conductive polymer element.

Features which may be possessed by gaskets and first or second articles for use in the present invention, or by composite articles for use in the present invention which combine a second article and a gasket, include but are not limited to the following. Other features are disclosed in the Detailed Description of the Invention given below. A single one, or a combination of two or more, of these features may serve to distinguish the gasket, first or second article, or composite article, from the prior art, and thus to define an article which is not only particularly useful in at least some embodiments of the method of the invention, but also forms part of the present invention in its own right.

(1) The gasket comprises a laminar conductive polymer element having electrodes attached thereto so that current flow between the electrodes is substantially parallel to the surfaces of the element.

(2) The gasket is attached to a second article which has at least one chamfered edge, preferably two chamfered edges which can slide relative to each other.

(3) The gasket is adjacent to a flexible second article over a substantial area and is attached to the second article over a minor proportion of that area (e.g. less than 50%, preferably less than 30%, particularly less than 10%) whereby the gasket can move relative to the second article when the combined article is wrapped around a substrate.

(4) The gasket is fused to a second article.

(5) The gasket comprises a conductive polymer which is (a) a sintered conductive polymer and/or (b) exhibits essentially ZTC behavior, and/or (c) has a low melt flow index above its melting point.

(6) The gasket has a conductive bridge across a central portion thereof.

(7) The gasket has conductive bridges attached to the electrodes to improve the uniformity of the heat output.

(8) The first article is articulated by reason of a cut made part way through the wall thereof.

BRIEF DESCRIPTION OF THE DRAWING

This invention is illustrated in the accompanying drawing, in which

FIG. 1 is a cross-section through an assembly in which two pipes are being joined together via a cylindrical coupler, using a wedge-shaped gasket at each end of the coupler;

FIG. 2 is a more detailed cross-sectional view of the gasket used in FIG. 1;

FIG. 3 is a cross-section through an assembly in which the edges of a flexible polymeric sheet are being joined together through a slotted article;

FIG. 4 is a cross-section through an assembly in which two pipes are being joined together via a wrap-around flexible coupler comprising a gasket secured to its inner face;

FIG. 5 is a cross-section on line 5—5 of FIG. 4;

FIG. 6 is an "unrolled" plan view of the gasket used in FIGS. 4 and 5;

FIG. 7 is a cross-section through an assembly in which two pipes are being joined together by a coupler having mating edges which can slide relative to each other and having a gasket secured to its inner surface;

FIG. 8 is a cross-section on line 8—8 of FIG. 7;

FIG. 9 is an "unrolled" plan view of the gasket used in FIGS. 7 and 8;

FIG. 10 is a cross-section through an articulated coupler comprising two gaskets secured to the inner face thereof;

FIG. 11 is a cross-section through a two-piece coupler comprising two gaskets secured to respective inner faces of the two parts of the coupler;

FIG. 12 is a partial cross-section through a pipe which is being repaired with a repair patch;

FIG. 13 is a plan view of FIG. 12;

FIG. 14 is a partial cross-section through a pipe to which a pressure access device is being secured; and FIG. 15 is a plan view of FIG. 14;

FIG. 16 is a perspective view illustrating an embodiment of a conductive polymer tape according to the fifth aspect of the present invention;

FIG. 17 is a cross-section view illustrating a pipe joint made with a coupling sleeve;

FIG. 18 is a cross-section view illustrating an assembly for making a butt weld type pipe joint using the tape of the present invention;

FIG. 19 shows the melt pattern achieved after the tape has been powered in FIG. 18;

FIG. 20 is a perspective view illustrating the use of gaskets of the present invention for joining two halves of an enclosure around a cable splice; and FIG. 21 is a perspective view illustrating another embodiment of a conductive polymer tape according to the fifth aspect of the present invention.

DETAILED DESCRIPTION OF THE INVENTION

The following detailed description of the invention has been divided up into various sections and sub-sections. It is to be understood that this is for clarity and convenience, and that relevant disclosure of a particular feature may be included in more than one section or subsection, that the headings of the sections and subsections are not to be regarded as having any limiting effect, and that the disclosure of this specification includes all the appropriate combinations of information found in the different sections and sub-sections. Similarly, although the various Figures and the descriptions thereof disclose specific embodiments of the invention, it is to be understood that where a specific feature is disclosed in the context of a particular Figure, such feature can also be used, to the extent appropriate, in the context of another Figure or the invention in general.

A. GASKETS

1. Method of Generating Heat

The gaskets employed in the present invention comprise a conductive polymer within which heat is generated in order to join the first and second articles together. Preferably, the heat is generated by passing current through a resistive conductive polymer heating element, and the invention will chiefly be described by reference to such use. However, other methods can be used, e.g. induction heating or ultrasonic heating, and it is to be understood that the disclosure herein relating to electrically heated conductive polymers is also applicable, to the extent appropriate, to conductive polymers which are heated in other ways. When heat is generated by passing current through the conductive polymer, the gasket must include electrodes (or buss wires) which can be connected to a source of electrical power. The dimensions and resistivity of the conductive polymer, the dimensions, resistivity and placement of the electrodes, and the power source, must be correlated so as to produce the desired heating effect to join the first and second articles together. Those skilled in the art will have no difficulty, having regard to their own knowledge and the disclosure herein, in achieving the desired result.

2. Location at Which Heat is Generated

An important factor in the present invention is the fact that heat is generated where it is needed, i.e. at or close to the surfaces to be joined. This has distinct advantages over processes in which heat is generated at some relatively remote point such that significant thermal barriers have to be overcome before the desired heating is achieved, and over processes in which heat is generated not only at the desired location but also at other locations. For example, the power consumption and heating time are reduced, and damage resulting from overheating can be eliminated or reduced. The first and second articles, and any components of the gasket in addition to the conductive polymer and electrodes (when present), should not be such that they prevent the desired generation of heat within the conductive polymer, and they are preferably such that no significant heat is generated within them. At least the first surface of the first article, and at least the second surface of the second article, are preferably nonconductive, e.g. both articles are composed of an insulating polymeric composition. If either the first or second surface is conductive, it is preferably separated from the conductive polymer by a layer of a non-conductive material.

3. Shape of the Conductive Polymer Element

It is in general desirable that heat should be generated over a substantial area in order to provide a satisfactory bond between the articles, and that the heat should be generated in such a way that, taking into account different rates of thermal transfer in the assembly, the heating is substantially uniform in those parts of the assembly where fusion (or activation of a thermally responsive insert) is desired. Non-uniform heating tends to result in non-uniform bonding and to cause overheating in the locations at which heat is generated in an attempt to supply sufficient heat to other locations at which bonding is desired. For this reason, it is preferred that the conductive polymer should be present in the form of a laminar element having a relatively wide and thin cross-section, e.g. a ratio of width to thickness of at least 8, preferably at least 20, particularly at least 50, especially 50 to 200, e.g. 100 to 160. Thus the laminar conductive polymer element can be in the form of a tape, particularly a flexible tape, which has a length which is for example at least 3 times, preferably at least 6 times, its width. The laminar conductive polymer element will generally be of uniform width and thickness, but can be of non-uniform width and/or non-uniform thickness, e.g. corrugated, ribbed or grooved. The average thickness of the tape is preferably 0.005 to 0.150 inch, particularly 0.01 to 0.05 inch. The ratio of the total surface area of the tape (i.e. including both surfaces to the volume of the tape is preferably at least 20 inch$^{-1}$, particularly at least 40 inch$^{-1}$, especially 40 to 100 inch$^{-1}$, e.g. 55 to 75 inch$^{-1}$.

4. Electrodes

The electrodes are preferably placed at opposite edge portions of a laminar conductive polymer element; they may be partially or completely embedded in the conductive polymer element or placed on a surface thereof, preferably the same surface. In this embodiment, substantially all of the current flows in the plane of the laminar element, little or none of the heated portion of the laminar element is covered by the electrodes, and the heat is generated in a bonding section which has substantial width and length, and is substantially free of metal. Thus the bonding section generally has an area of at least 0.25 square inch, preferably at least 1 square inch, particularly at least 4 square inch, especially at least 10 square inch, e.g. 10 to 120 square inch, and has a width which is preferably at least 0.4 inch, particularly at least 1 inch, e.g. up to 10 inch, and a length which is preferably at least 1 inch, particularly at least 3 inch, especially at least 10 inch, e.g. 20 to 200 inch. Much larger dimensions can be used. For example, when joining large pipes, the bonding area can be 2,000 to 3,000 sq. inch. A large metal-free bonding section provides important benefits, because the presence in a bonding section of metal wires or strips (e.g. metal wires and strips such as have been used in prior art joining methods as resistance heaters) often reduces the overall strength of the bond.

The electrodes which are generally present in the gaskets are preferably such that substantially no heat is generated within them. However, they can be of dimensions and resistivity such that substantial heat is generated within them, either uniformly along their length or in a desired pattern. The electrodes are preferably composed of copper, but can be composed of another metal or other material of appropriate resistivity.

The electrodes are preferably longitudinal electrodes (e.g. metal strips, braid, or silver paint or a combination of these) applied along (or near) the edges of one or both surfaces. In a preferred embodiment, the electrodes are attached to the conductive polymer by the use of a conductive adhesive. The conductive adhesive, which is preferably in the form of a self-supporting strip composed of an organic polymer and, dispersed in said polymer, a particulate conductive filler, is positioned between the tape and the electrodes or other laminar elements, and the assembly is laminated under pressure at a temperature sufficient to melt the adhesive.

Although the electrodes are preferably placed at opposite edge portions of a laminar conductive polymer element, it is also possible to place electrodes on opposite sides of a laminar conductive polymer element so that they overlap each other, thus producing current flow which is partially or, preferably, completely at right angles to the plane of the element. Under these circumstances, it is preferred that (1) the conductive polymer elements should be continuous and the electrodes apertured (e.g. the electrodes are expanded metal mesh electrodes) so that fusion can take place between the conductive polymer in the apertures and an adjacent polymeric surface, or (2) that there should be apertures running through the electrodes and the conductive polymer element so that fusion can take place, through the apertures, between polymeric surfaces on either side of the conductive polymer element. Such apertures can for example provide 30 to 90% of each surface of the heating element.

5. The Conductive Polymer

An noted above, an important factor in the present invention is the fact that heat is generated where it is needed, the conductive polymer element being sandwiched between the surfaces to be joined and maintained in intimate contact with them. This has important implications for the preferred nature of the conductive polymer employed and the rate at which power is generated therein.

Because the conductive polymer is surrounded by and in intimate contact with the components adjacent thereto, and because it is relatively thin, heat can be removed from it very uniformly and efficiently. It is, therefore, possible to heat the conductive polymer to a temperature well above its melting point, and to maintain it at such a temperature for a relatively long time, without danger that part of it will become degraded through overheating, thus leading to a weak spot in the bonding section. The generation of high temperatures in this way is very useful in ensuring rapid melting and consequent fusion of adjacent polymeric surfaces, or rapid curing of a thermosetting resin, or rapid activation of a hot melt adhesive, or the like. On the other hand, if the conductive polymer becomes too fluid at the elevated temperature, it will tend to flow so as to disrupt the desired current flow and change the amount and/or the distribution of the heat generated within it. Flow of the conductive polymer out of the recess will also tend to reduce the pressure between the various elements and to result in less efficient bonding. For these reasons, it is preferred to use a conductive polymer which maintains substantial strength above its melting point, for example a polymer which, at a temperature 50° C. above its softening point, has a Melt Flow Index of less than 0.3 g/10 min, particularly leas than 0.1 g/10 min, especially less than 0.05 g/10 min, at a loading of 3 kg, and a Melt Flow Index of less than 3.0 g/10 min, particularly less than 1.0 g/10 min, especially leas than 0.1 g/10 min, at a loading of 15 kg. Flow of the current-carrying conductive polymer can also be minimized by placing one or more barriers to such flow around the current-carrying conductive polymer. Such a barrier can be provided for example by an adjacent and integral portion of conductive polymer through which little or no current flows, or through an adjacent barrier of an insulating polymer which may be separate from or integral with the conductive polymer.

Just as flow of the conductive polymer out of the recess reduces the bonding pressures available, so also expansion of the conductive polymer increases the bonding pressures. It is, therefore, preferred to use a conductive polymer which increases substantially in volume as it is heated, preferably one which increases in volume by at least 10%, preferably at least 15%, when it is heated from 23° C. to the melting point of all least part of the polymeric component of the conductive polymer. In many cases, the conductive polymer is heated to a temperature well above its melting point, and it will continue to expand during such heating. Preferably the conductive polymer increases in volume by at least 20%, particularly at least 25%, especially at least 30%, between room temperature and the highest temperature which it reaches during the method.

When, as is preferred, the conductive polymer becomes fused to an adjacent polymeric surface, it is necessary for it to be heated to a sufficiently high temperature for fusion to take place. If the conductive polymer exhibits PTC behavior, it may not reach a high enough temperature. It is preferred, therefore, that the conductive polymer should exhibit essentially ZTC behavior in the temperature range of operation, and in particular that it should increase in resistivity by a factor of less than 5, preferably less than 2, particularly less than 1.3, over a temperature range of 23° C. to 2500° C. and/or over a temperature range of 23° C. to $(T_m+50)°$ C., where $T_m$ is the softening point of the composition.

Having regard to the preferred features set out above, conductive polymers which are particularly useful in the present invention comprise, and preferably consist essentially of, (a) a matrix consisting essentially of organic polymer particles which have been sintered together so that the particles have coalesced without completely losing their identity, particularly particles of ultra high molecular weight polyethylene (UHMWPE), and (b) a particulate filler, preferably carbon black, which is dispersed in said matrix but which is present substantially only at or near the boundaries of the coalesced particles.

Such sintered conductive polymers are described, for example, U.S. Pat. No. 4,853,165, the disclosure of which is incorporated herein by reference. UHMWPE generally has a molecular weight of at least 1.5 million, preferably greater than 3.0 million, e.g. 4 to 6 million other polymers that may be sintered include polyvinylidene fluoride, polyaryleneetherketones, polyetheretherketones, polytetrafluoroethylene, polyphenylene sulfide, and polyimides.

Sintered conductive polymers can be prepared by sintering a dry blend of the polymer particles and the filler. A typical process involves compaction of the dry blend, sintering of the compacted blend at or above atmospheric pressure and at a temperature at which the polymer softens but does not flow excessively, followed by cooling under pressure. The sintering is preferably conducted as part of a ram extrusion process which produces a rod, and the rod is then skived on a lathe, or otherwise machined, to-produce a conductive polymer tape of desired surface texture and shape. For many purposes a tape of substantially rectangular cross-section is satisfactory, but if desired a corrugated, ribbed, or grooved tape can be obtained through the use of a skiving blade of an appropriate shape. Such an irregular shape may be desirable to concentrate pressures at desired points and/or to increase the surface area of the tape, e.g. for heat transfer or bonding purposes.

Other conductive polymers which can be used include those which are based on the so-called very high molecular weight polyethylenes (VHMWPE) having molecular weights of less than 1.5 million and which can be processed by melt-extrusion. VHMWPE polymers generally have molecular weights in the range of 150,000 to 600,000, preferably 200,000 to 400,000.

The resistivity of the conductive polymers used in this invention is generally quite low, e.g. below 1000 ohm-cm, particularly below 100 ohm-cm, especially below 10 ohm-cm, for example, in the range of about 0.5 to 10 ohm-cm. If the conductive polymer is to be electrically powered, the desired resistivity depends upon the power source, which may be of any kind, for example DC of 6 to 48 volts or AC of about 120 or 240 volts. Sintering produces low electrical resistivity at a lower conductive filler loading than for a melt-blended product. Thus the preferred sintered compositions for use in this invention contain less than 9%, preferably less than 7%, particularly 2–6%, by volume of carbon black and/or other conductive filler. Particularly preferred carbon blacks are those sold by Akzo Chemie under the tradename Ketjenblack EC and by Degussa under the trade-name Printex XE-2. The low levels of carbon black help to maintain the desired physical properties of the polymer such as flexibility, good elongation, high tensile strength, good notch and impact resistance, and good chemical resistance. The conductive polymer may optionally be crosslinked, providing that this does not prevent any desired fusion thereof.

6. Methods of Assembly, and Shape of Gasket

The gasket should preferably be such that when the gasket and the first and second articles are moved relative to each other, a good interference fit can be achieved between them, thus achieving the desired intimate contact. If the two articles are placed adjacent to each other and the gasket is placed in the recess between them, or if the gasket is prejoined to one of the articles but is not in intimate contact with that article, the relative movement produces intimate contact between the first and third surfaces and between the second and fourth surfaces. If the gasket has already been brought into intimate contact with one of the articles, e.g. by preassembly of the second article and the gasket, the relative movement produces intimate contact between the surfaces which are not yet in intimate contact, e.g. the first and third surfaces. In many cases, the requirement for intimate contact will mean that the gasket has a relatively wide and thin crosssection, e.g. a ratio of width to thickness of at least 4, preferably at least 10, and often substantially more, for example at least 50, particularly 50 to 200, especially 100 to 160. Thus the gasket may be in the form of a tape, which will generally be of uniform width and thickness, but can be of non-uniform width and/or non-uniform thickness. In many cases, it will be desirable for the tape to be sufficiently flexible to be fitted into the recess, e.g. a recess between a pipe and a coupler, and to have a length which is for example at least 3 times, preferably at least 6 times, its width, and may be much more.

7. Conformance of Articles to Each Other During Assembly

The relative movement of the first and second articles and the gasket can have the very desirable result of changing the shape of one or both of the articles so that the recess between them is of substantially uniform dimensions. For example, an out-of-round pipe can be placed inside a round coupler, and the gasket used to press the pipe into a round shape. Alternatively, the gasket can change its shape under pressure so as to fill a recess of irregular dimensions.

8. Rate at Which Power is Generated, and Temperature Distribution

One of the remarkable features of the present invention is the high rate at which power can be generated within the conductive polymer (without causing substantial degradation thereof) over periods which are long enough to produce the desired fusion (or other physical or chemical effect) at the boundaries of the conductive polymer heating element. This makes it possible to use power sources of much higher voltages than have previously been contemplated; however, it must be remembered that the higher the voltage, the more carefully the duration of the heating must be controlled. Thus an AC voltage of 600 volts or more can be employed. In another method, the heater can be powered by the discharge of one or more capacitors, thus providing both a high voltage and controlled overall power consumption.

The power source and the conductive polymer element are preferably such that the power output of the element is 5 to 120, particularly 7 to 40, especially 10 to 20, watts per square inch of the total surface area of the element (including both surfaces). One of the advantages of the present invention is that the total energy used is limited because substantially all the heat is generated at the required site. Thus the energy density $A/(P \times t)$ (where P is the power in watts per second, t is the time in seconds for which the conductive polymer heater is connected, and A is the total surface in square inch of the heater, i.e. including both surfaces thereof) is generally 10 to 100,000, preferably 50 to 25,000, particularly 100 to 5,000, for a time (t) which is generally less than 1,500 seconds, preferably less than 800 secs, particularly less than 150 seconds, especially 10 to 120 seconds. The conductive polymer element, when contacted on one or both sides by a solid substrate, is preferably capable of withstanding a power load of at least 50 watts/cm$^3$, particularly at least 100 watts/cm$^3$, e.g. up to 200 watts/cm$^3$ or even higher. The various quantities given above are at steady state conditions. When the power supply is first switched on, the quantities are usually higher, e.g. twice as high for a very short period of time, because the conductive polymer does show some increase in resistivity with temperature.

Another way of quantifying the difference between the present process and processes in which a relatively thick conductive polymer heater is used is to look at the temperature gradient across the conductive polymer element, which is relatively small in the present invention. Thus in the method of the invention, we believe that the maximum temperature difference between the center of the conductive polymer element and the outer surface of the element is generally less than 150° C., preferably less than 100° C., particularly less than 75° C., especially less than 50° C.

The temperatures which should be reached at the first and third surfaces and at the second and fourth surfaces depend upon the way in which the surfaces are to be joined together and the nature of the materials at the interface. In general, the higher the temperature the better, providing that none of the materials is degraded. When fusion is desired, the temperature preferably exceeds the melting point of the material of each surface. When joining is achieved via an insert, the temperature must be sufficient to activate the insert. In preferred processes, a temperature of at least 135° C., preferably at least 150° C., particularly at least 200° C., especially at least 250° C., e.g. 300° C. or more is achieved.

We have found that when the surfaces are to be fused together, the rate and duration of the heating are preferably such that the material at each of the first and second surfaces is melted to a depth which is at least sufficient to permit molecular diffusion across the interface. On the other hand, if the surface is melted to an excessive depth, this is not only wasteful of power but can also cause the formation of voids on cooling. The surface is preferably melted to a depth of 0.02 to 0.1 inch, particularly 0.035 to 0.08 inch, especially 0.04 to 0.06 inch. If desired, the depth to which melting has taken place can be monitored with the aid of holes drilled from the outside of the article and leaving a precisely known wall thickness between the bottom of the hole and the surface which is to be fusion bonded to the gasket; as soon as melting to the bottom of the hole has taken place, molten polymeric material will be extruded through the hole. If the depth of melting is too great, it can be reduced by increasing the power and reducing the duration of the heating.

9. Use of Conductive Bridges to Control Generation of Heat

In some cases, we have found, it is difficult or impossible to ensure that the whole of the gasket makes intimate contact with another solid body so that heat is rapidly removed through the whole of the gasket surface. For example, when using a wedge-shaped gasket to fill the recess between a pipe and a coupler, the tip of the gasket may not be in contact with either the pipe or the coupler, and if heat is generated in a conductive polymer element wrapped around the tip, overheating may result. Similarly, if a composite article comprising a second article and gasket is wrapped around the ends of two pipes to be joined, then unless the pipe ends are precisely mated together (which rarely happens), excessive heat may be generated in the conductive polymer which overlies the gap between the pipes. This problem can be solved by using a plurality of conductive polymer heating elements, each having its own electrodes. We have found, however, that a better solution is to provide a conductive bridge over or through that part of the conductive polymer element which is liable to become overheated. The conductive bridge can be, for example, a layer of a low resistivity material, e.g. a silver- or other metal-comprising material, which has been applied, e.g. by printing, to appropriate parts of one surface of the conductive polymer element. The bridge ensures that little or no heat is generated in the conductive polymer in the bridge area. The bridge itself is preferably of low resistance so that substantially no heat is generated therein, but it can be chosen so as to generate a controlled amount of heat, less than would be generated in the conductive polymer in the absence of the bridge. The bridge is preferably shaped so as to avoid undue current concentration; for example a bridge in the form of a peninsula preferably has a round or pointed end. The electrodes and/or the bridge can for example be produced by etching a continuous metal layer on the surface of a conductive polymer element.

A conductive bridge can also be used to change the effective shape of strip electrodes running down the side of the conductive polymer element. For example, the presence of a central conductive bridge along part of the length of a heating element can cause the heating element to be substantially hotter in the end area which does not contain the central conductive bridge. To avoid this, conductive bridges can be placed over each of the electrodes in the end area in order to reduce the path length between them and make the heating more uniform. This is illustrated for example by FIG. 9.

10. Windows in Conductive Polymer Elements

While the use of a conductive bridge often produces very valuable results, failure to heat one part of the conductive polymer can produce an unbalanced physical response of the gasket as a whole which is undesirable. In some cases, therefore, it may be desirable to weaken or remove part of all of the conductive polymer in the bridge region; this may make it necessary to use a physically stronger conductive bridge than would otherwise be required.

A particular example of this can arise when a heating element having a conductive bridge but no window therein is fused to the second article to make a preassembled composite coupler which is used to join two pipes. If the composite article is brought into intimate contact with the pipes by means of bands of metal or other non-elastic material, the expansion of the heating element can only be accommodated by driving the pipes away from each other. This problem does not arise if the restraining means has sufficient elasticity to allow the expansion to take place radially. Nor does the problem arise if the heating element is not fused to the coupler and there is room for the conductive polymer in the bridge area to buckle up between the pipe ends. If there is a window in the bridge area then the expansion can be accommodated by movement of the conductive polymer into the window. Movement of this kind can be beneficial in effecting interpenetration of the materials at the interface.

11. Non-heat-recoverable and Heat-recoverable Articles and Gaskets

One of the advantages of the present invention, as compared to many methods previously proposed, is that in general, excellent results can be obtained using first and second articles and gaskets which are not heat-recoverable. When we say herein that an article is "not heat-recoverable", we mean that if the article is heated on its own to any temperature used in the method and is then cooled back to room temperature, its dimensions at room temperature are not substantially changed (e.g. no dimension changes by more than 10%), by such heating and cooling. It will be understood; however, that the invention does not exclude the possibility that the first or the second article or the gasket is heat-recoverable. Indeed, for example, if the recess between the articles is relatively wide or irregular in shape, it may be desirable for at least a part of the gasket to be heat-recoverable so as to ensure that it fills the recess and/or drives a sealant material in a desired direction. If the first or the second article is heat-recoverable, the gasket is unlikely to provide sufficient heat to bring about satisfactory recovery thereof, so that an additional heat source is needed.

12. Gaskets Containing Central Members

As briefly indicated above, the gasket can comprise one or more conductive polymer heaters combined with a central member. The central member preferably plays no part in the generation of heat. For example it can be composed of an insulating polymeric material, which may be reinforced by means of fibers distributed therein or by a reinforcing member which is surrounded by the polymeric material. The central member can have a single laminar conductive polymer element wrapped partially or completely around it, or can have two or more conductive polymer elements, preferably laminar, attached to appropriate parts, e.g. opposite faces, thereof.

The conductive polymer element(s) which is (are) used in combination with a central member can be combined therewith in situ, but are preferably secured thereto before being placed in the recess. The conductive polymer element(s) can be firmly secured to the central member, e.g. by fusion, before the gasket is placed in the recess. In any event, the conductive polymer element(s) must, by the time the method is completed, be firmly secured to, preferably fused to, the central member, so as to provide a secure bond between the first and second articles, through the gasket.

The central member can if desired be heat-recoverable, so that generation of heat in the conductive polymer element(s) will cause it to recover towards a desired new configuration, e.g. one which will lock the gasket in place or hells to fill the recess between the articles. It is also possible for part or all of the central member to be deformable, e.g. compressible, so that it can conform to the shape of the recess, and such deformation can be elastic or plastic. Thus part or all of the central member can be composed of a polymeric foam, preferably a closed cell foam. This is particularly useful when sealing around a cable, e.g. a telephone cable.

The shape of the central member (and, therefore, usually the shape of the gasket as a whole) will be dictated or influenced by the shape and dimensions of the articles to be joined and the recess between them. In one preferred embodiment, the articles are shaped so as to form between them a recess which has a wedge-shaped cross-section, and the central member comprises a corresponding wedge-shaped cross-section. The angle of the wedge section can be for example from 2° to 45°, preferably 4° to 15°, particularly 5° to 10°, e.g. about 6°, and it can be formed by substantially straight sections which are for example 1 to 6 inches, preferably 1.25 to 4 inches long; for example the central member can have a cross-section consisting of a rectangular base section 0.2 to 2 inch in length and 0.1 to 0.75 inch high, and an integral wedge section formed by straight lines 1.25 to 3 inches long which meet at a blunt tip with an included angle of 4° to 8°. One of the advantages of using a wedge-shaped gasket is that as the gasket is driven into the recess, it can change the shape of the first and/or the second article so as to conform their shapes.

Especially when the central member comprises a wedgeshaped cross-section, or is otherwise used to create pressure which assists in the joining process, it is important that the central member should retain sufficient strength during step (4) of the process. The central member is, therefore, preferably composed of a material which, under the conditions of step (4), is as viscous as or more viscous than the other materials at the heated interface.

13. Use of Wedge-shaped Gaskets to Join or Repair Pipes

We have obtained excellent results in methods for joining or repairing pipes through the use of an elongate flexible gasket comprising a central member comprising a wedge-shaped cross-section and an elongate laminar conductive polymer tape which is folded along its length and placed around the tip of the wedge. These methods will be described as methods for joining pipes, but is to be understood that the same technique can be used for joining other articles and for repairing (or otherwise modifying) a single pipe or other substrate. The method is illustrated in FIGS. 1 and 2 of the accompanying drawings.

The pipes are joined together with the aid of a one-piece cylindrical coupler which has an inside diameter slightly larger than the outside diameter of the pipes, and which has conical entry sections on the inner surface at each end. The pipe ends are placed within the coupler, preferably butting against each other, thus forming a circular recess with a wedge-shaped cross-section at each end of the coupler. At each end of the coupler, the wedge-shaped gasket is wrapped around the pipe, cut to length, and then driven into the recess, thus forming a tight interference fit. Particularly when large pipes are being joined, it is not easy to cut the gasket to precisely the correct length, as is necessary if the pipes are not only to be joined physically to the coupler but also to be sealed thereto. We have found that the most reliable procedure is to cut the gasket somewhat short of the required length, to drive the gasket into place (eg. starting at a point opposite the ends of the gasket), and then to fill the gap between the ends of the gasket with a short piece of the gasket, whose required length can now be measured very accurately. This technique can also be used in any situation in which a flexible gasket is to be inserted into a long recess.

One advantage of this method of joining pipes, which is most apparent when joining polymeric pipes of large diameter (e.g. of inner diameter greater than 6 inch and up to, for example, 120 inch, particularly 10 to 60 inch) is that the wedging action of the gasket can conform the shape of the pipe to that of the (more rigid) coupler. This is particularly useful for larger polymeric pipes because they tend to assume an out-of-round shape in storage. Another advantage of this method is that when a pipeline is to be made by joining together a plurality of pipes, with a pipe coupler at each joint, the process can be carried out in two distinct stages. In the first stage, steps (1), (2) and (3) of the process can be carried out at each joint, thus making a pipeline which is in place and will remain assembled if not disturbed, but which can still be disassembled if modifications are needed. In the second stage of the process, step (4) is carried out at each joint, thus making the pipeline permanent.

The method described above can be modified, through the use of a one-piece coupler of more complex shape, and/or through the use of appropriate inserts on one or both sides of one or both of the gaskets, to join pipes at an angle and/or to join pipes which are composed of different materials and/or sizes.

The method described above can also be modified by using a coupler composed of two or more parts such that the coupler can be placed around a pipe without requiring access to an end of the pipe. In this case, the seams between the different parts of the coupler must also be sealed, preferably with the aid of laminar gaskets as described. In addition, restraining means must be placed around the composite coupler after its assembly around the pipe, to contain the forces generated by driving the gasket into place.

14. Restraining Means for Holding Articles in Place

The method just described, when making use of a one-piece coupler with wedge-shaped gaskets for joining pipes, is an example of a situation in which the desired intimate contact between the surfaces to be joined is achieved by driving a wedge between two substrates which, by reason of their own shape, are capable of at most limited movement relative to each other. When a two-piece coupler is used, and in other cases in which a wedge-shaped gasket is employed and movement of the gasket produces the desired intimate contact, restraining means, e.g. clamps, must be used to contain and utilize the wedging forces, and thus maintain the intimate contact. When wedging forces are not employed, as for example in the techniques described below, restraining means must be employed both to cause the relative movement which produces the desired intimate contact and to maintain that intimate contact. Suitable restraining means can be of any kind which will continue to exert the desired forces during step (4) of the method. For example, when forcing a second article into intimate contact with the outside of a first article, e.g. a pipe, elastomeric organic material of any kind can be wrapped around the first and second articles. Hose clamps and the like can also be used. Techniques and materials of the kinds employed for strapping loads onto pallets, e.g. steel bands which are tensioned by ratcheted levers, are also useful when larger forces are required. We have also obtained excellent results using a heat-shrinkable polymeric tape which is wrapped tightly around the two articles. As a result of the heat generated in the gasket, aided if necessary by external heating, the tape shrinks during step (4) and thus ensures that the desired intimate contact is maintained. The shrinkage required is small, e.g. less than 10%. Many polymeric tapes, e.g. polyimide tapes, will shrink to this extent when heated.

The second article can also be placed inside a hollow first article, e.g. a pipe, and driven into intimate contact with the inner surface thereof by an expansion means, which can for example be expanded by mechanically generated forces or by a bladder which is expanded by hydraulic or other forces.

If desired, one or both of the articles can comprise one or more grooves, ridges, hooks or other indentations or projections which will cooperate with a restraining means to bring the articles into intimate contact. It is also possible for the restraining means itself to be secured to one of the articles, or for each of the articles to comprise a part of a restraining means so that when the articles are assembled, the parts cooperate to provide a restraining means.

15. Slotted Articles

In another embodiment, one of the articles comprises a slot, and an edge portion of the other article is inserted into the slot, with a gasket between the side of the slot and one side of the inserted edge portion, preferably with a gasket between each slot side and each side of the inserted edge portion, for example a gasket wrapped around the inserted edge portion. One of the articles can be a strip comprising two slots, and the opposite edge portions of a flexible sheet, preferably a heat-shrinkable polymeric sheet, can be inserted into the slots, thus forming a wraparound assembly for a substrate. This procedure is illustrated in FIG. 3.

The slotted strip may be essentially circular, oval or rectangular in cross-section and preferably has opposing slots separated by a center region. The edge portions may be positioned in the sealing strip either by sliding the strip over the edge portions or by inserting the edge portions transversely into the strip. Preferably some means is provided for holding the edge portions in the slots, e.g. by use of a wrap such as an elastomeric band positioned around the circumference of the sleeve. The slots may be smooth or of a shape designed to maintain the position of the edge portions during heating or assembly, e.g. a shape designed to give a snap-fit to the edge portions.

16. Non-Wedging Techniques

Although it offers substantial advantages over the prior art methods, the use of a wedge-shaped gasket is not entirely satisfactory. It is essential to insert the gasket correctly around the whole periphery of the pipe, since failure to do so will lead to a leaky joint. This requirement makes the method somewhat craft-sensitive, and is a particular disadvantage when the pipes must be joined under adverse conditions, e.g. at a construction site, especially if skilled workers are not available.

In order to remove the need to force a wedge-shaped gasket into the recess, it is necessary for the gasket to be brought into intimate contact with the pipe(s) and the coupler in some other way. We have realized that this result can be achieved by making use of a first article (e.g. the pipe or pipes) which is relatively strong and rigid and a second article (e.g. the coupler) which is relatively deformable, and by forcing the second article against the first article with one or more gaskets sandwiched between them. An additional advantage of this technique is that the gasket or gaskets can be secured to the coupler before the coupler is placed around the substrates, thus ensuring that the gasket(s) is (are) correctly placed. The gasket or gaskets function both to bond the coupler to the substrate and to bond overlapping parts of the coupler to each other to ensure a properly sealed joint. As in the method described above for joining pipes with the aid of wedge-shaped gaskets, the techniques just described can also be used when the "coupler" does not join two pipes together, but rather repairs or otherwise modifies a single pipe or other substrate.

Similar techniques can also be used to secure a second article to the interior of a hollow article, the diameter of the second article being increased by the application of mechanical forces.

17. Flexible Tapes as Wrap-around Couplers

In one embodiment, the second article is a flexible tape, and a flexible laminar gasket is secured to one face thereof; the combined article is wrapped tightly around the first article; the wrapped end is secured in place during step (4); and the heat generated within the gasket causes the tape to become bonded to the first article in the non-overlapped area and to itself in the overlapped area. The term "tape" is used herein in a broad sense to denote any elongate article having a substantially flat cross-section, and thus includes for example articles whose unstressed configuration is flat and articles whose unstressed configuration is curved, including substantially tubular. The terms "flexible" and "wrapped" are used herein in a broad sense to denote any article which can be passed transversely over a pipe or other substrate and can then be brought into intimate contact with the substrate by the application of mechanical forces.

Thus in this embodiment of the invention, the tape can be a relatively thin flat polymeric tape such that the combined article can easily be wrapped by hand in multiple wraps around the first article. Alternatively, the tape can be a relatively thick and curved article obtained by making one or more longitudinal cuts in a polymeric tube having an inner diameter larger than, preferably only slightly larger than, the outer diameter of the first article. A laminar gasket is then secured to the inner surface of the tape. The combined article is passed transversely over the first article and then forced into intimate contact with the tape. Very large crimping forces can be used, often limited only by the need not to deform the first article. Preferably the combined article has the necessary flexibility at room temperature, but the invention includes the possibility of heating the combined article, e.g. by passing current through the conductive polymer, to increase its flexibility, before it is wrapped around the substrate.

Unless the tape is thin enough to make this unnecessary, the covered edge of the flexible tape is preferably chamfered so as to provide a smooth transition and ensure that there is not a void between the gasket and the second article in this area. When the tape is a relatively thick and inflexible one, so that it must be crimped into place, such a chamfered edge also helps the outer wrap to slide over the transition and thus achieve the desired intimate contact.

When a relatively thin and flexible polymeric tape is used, depending upon the thickness of the tape and the properties needed in the final article, the extent of the wrapping may merely be sufficient to seal the wrapped edges, or there may be multiple wraps to provide improved physical properties. Alternatively or additionally, the physical strength of the coupling can be increased by means of an outer coupler (which can optionally also serve as a restraining means in step (4)); since the coupler of the invention provides a seal around the pipe(s), the outer coupler need not do so.

When a relatively thick and inflexible polymeric tape is used, e.g. one cut from a tube, the overlap area will often be confined to the chamfered lower edge of the coupler. In that case, the overlapping edge is preferably also chamfered so that it will mate with the lower edge but is capable of sliding over it.

18. Use of Couplers Having Sliding Edges

The one-piece wrap-around coupler having chamfered edges, as just described, is one example of a preferred class of couplers, namely those comprising mating edges which contact each other (usually through a gasket) when the coupler is in place, and which can slide relative to each other in a circumferential direction when appropriate mechanical forces are used to change, usually to reduce, the diameter of the coupler. Preferably the mating edges are produced, or theoretically could have been produced, by cutting a tube from end to end thereof along a cutting surface which, when projected, does not pass through the center of the tube, preferably along a plane which is parallel to the axis of the tube and which forms an angle of 0° to less than 90°, e.g. 0° to 45°, preferably 0° to 20°, especially 0° to 10°, with a plane which is tangential to the inner surface of the tube at the point where the cutting surface cuts the inner surface of the tube. However, other more complex shapes can also be used, for example stepped configurations.

18A. Non-Wrap-Around Couplers With Sliding Edges

The one-piece wrap-around coupler having chamfered edges and obtained by cutting a polymeric tube longitudinally, as described at the end of section 17, can of course also be used, when there is access to the end of the pipe, by passing it longitudinally over the pipe. Furthermore, in such a situation there can also be used a coupler which is of similar design but has insufficient flexibility to be used as a wrap-around article, though retaining sufficient flexibility to be forced into intimate contact with the substrate. Thus a non-wrap-around coupler can be made of more rigid material and/or have a greater wall thickness.

18B. Articulated Wrap-Around Couplers With Sliding Edges

When it is desired to user as a wrap-around coupler, a one-piece coupler which has insufficient flexibility to be passed transversely over the substrate, one way of achieving the desired result is to form at least one longitudinal line of weakness in the coupler, thus increasing its flexibility. In such a coupler, the line of weakness in effect forms a joint, and such a modified coupler is therefore referred to herein as an articulated coupler. Preferably, measures are taken to ensure that the line of weakness does not remain in the finished coupler. In a preferred embodiment the line of weakness is produced by making a longitudinal cut partially through the wall of the coupler, e.g. through 40 to 70% of the wall thickness, the cut preferably being made from the inside, and preferably at a substantial angle to the radial direction, e.g. at an angle of 30° to 75°, preferably 45° to 65°, to the radial direction. The gasket can be placed within this cut, as well as on the inside surface and one of the sliding edges of the coupler, and this will ensure that the line of weakness does not remain in the finished article. An articulated coupler of this kind is shown in FIG. 9.

18C. Multi-Part Wrap-Around Couple With Sliding Edges

Closely related to the articulated couplers described above are multi-part couplers comprising components which are completely separate, rather than flexibly joined to each other. Such multi-Part couplers typically comprise two separate components, but there may be more, e.g. three or four, particularly when the coupler is a complex one for joining disparate substrates, e.g. pipes of different size and/or different materials. In such multi-part couplers there are at least two longitudinal junctions formed by abutting edges of the components. At at least one, and preferably at each, of the junctions, the abutting edges are shaped so that they can slide relative to each other, and thus accommodate a change in the diameter of the coupler. A two-part coupler of this kind is illustrated in FIG. 10.

19. Couplers without Sliding Edges

The various couplers described in sections 16-18 above are also useful in the present invention when they do not have sliding edges or other means which enable them to change in diameter when pressed into intimate contact with the substrate. However, in that case, they must be precisely sized to the substrate, and/or additional measures must be taken to ensure a satisfactory longitudinal joint along the abutting edges.

20. Use of the Invention for Purposes Other than Joining Pipes

The invention is chiefly described herein by reference to its use for joining pipes. However, it is to be understood that the invention is also useful for joining any two or more articles together, especially articles whose adjacent surfaces are composed of the same polymeric composition or of different but compatible polymeric compositions and which are joined together by fusion to opposite faces of a laminar conductive polymer element. Where the invention is described herein for joining pipes, it is to be understood that the description is also applicable, to the extent appropriate, to joining other substrates.

One important use of the present invention is in repairing damaged pipes. For this purpose, the wrap-around "couplers" described above can be used. It is also possible to use a simple repair patch which is for example round or rectangular and which is flexible enough to conform to the shape of the pipe and/or is saddle-shaped to fit onto the pipe. Depending upon the extent of the damage, it may be desirable for a section of the conductive polymer element to be removed or provided with a conductive bridge, in order to avoid overheating thereof in the damaged area, as discussed in sections 9 and 10 above. The use of a repair patch is illustrated in FIGS. 11 and 12.

Another important use of the present invention is to provide a port (e.g. for a branch pipe, a pressure access device or a tap) on a pipe, cable or other supply line containing a fluid or gas. In this use, the second article is similar to one of the wrap-around couplers or repair patches described above, but in addition comprises a fitting which provides a port of desired dimensions. Before or after the second article has been secured to the supply line (usually after), a hole is drilled through the supply line so that the port communicates with the interior of the supply line. This use is illustrated in FIGS. 13 and 14.

21. Overheating and Insulating Carriers

We have found that when two heating elements are adjacent to each other in a section having a relatively small amount of the first and/or second articles, overheating can occur and/or there can be current flow between the adjacent heating elements (as for example in the tip of the edge portions 212 in FIG. 11). This problem can be alleviated by placing an insulating barrier over the edge of one or both of the heating elements in the relevant section.

22. Reentry

In many cases, especially when the surfaces have been joined by fusion, repowering the heating element(s) makes it possible to separate the first and second articles from each other.

The invention is illustrated in the accompanying drawing. Before discussing the various Figures, it should be noted that in each of them, the thicknesses of the conductive polymer element, the electrodes, the conductive bridges, and the various restraining means are exaggerated in the interests of clarity. In each of the Figures, the conductive polymer is a sintered mixture of ultrahigh molecular weight polyethylene and carbon black.

FIGS. 1 show two polyethylene pipes 11 and 12 which are being joined together by a cylindrical polyethylene coupler 21 having conical entry sections 211 and 212 at the ends thereof. At each end of the coupler, a flexible wedge-shaped gasket 3 is wrapped around the pipe and forced into the wedge-shaped recess between the pipe and the coupler. The gasket, which is shown in detail in FIG. 2, comprises a central member 32 which is composed of polyethylene, and a laminar conductive polymer member 31 having electrodes 33 and 34 attached to its edge portions; leads 38 and 39 extend from the bus bars for connection to a power supply (not shown). In the part of the member 31 which is wrapped around the tip of the central member 32, a conductive bridge 35 is secured to the surface of the conductive polymer to ensure that heat is not generated in the tip area. After the components have been assembled as shown in FIG. 1, with the gaskets making a good interference fit, the power supply is switched on, heat is generated in the conductive polymer member 31, and the pipes and the coupler become fused to opposite sides of the gasket.

FIG. 3 shows a slotted strip 21 having slots 211 in opposite faces thereof. A heat-shrinkable sheet 15 (shown in part only) is wrapped around a cable 9 (also shown in part only). A gasket 3, which is the same as that shown in FIGS. 1 and 2 except that there is no central member 32, is wrapped around each of the edge portions 151 of the sheet 15, and the edge portions and gaskets are inserted into the slots 211. By powering the gaskets while maintaining the edge portions in the slots, the edge portions are fused to the strip. The sheet 15 can then be shrunk, e.g. by means of hot air, so that it recovers around the cable.

FIGS. 4 and 5 show two polyethylene pipes 11 and 12 which are being joined together by means of a flexible wrap-around coupler which comprises a sheet 21 of polyethylene and a laminar heater comprising a laminar conductive polymer element 31.

The inner edges of the sheet 31 and element 21 secured together and are chamfered at 212 to provide a smooth transition area in the wrapped assembly. Sheet 31 and element 21 are secured to each other only in the region of the inside edge, so that they can move relative to each other as the coupler is wrapped around the pipes. As best shown in the plan view of the "unrolled" coupler in FIG. 6, there are electrodes 33 and 34 secured to the surface of the heating element 31 along the edges thereof. There is also a conductive bridge 35 secured to one face of the heating element so that heat is not generated in the area of the heating element which covers the gap between the pipes.

After the flexible coupler has been wrapped around the pipes, using a sufficient number of wraps to obtain a final joint of desired strength, it is then secured in place by overlapping wraps of a heat-shrinkable polyimide tape 41. The heater is then powered, thus fusing the coupler to the pipes and to itself and shrinkage of the tape 41.

FIGS. 7 and 8 show two polyethylene pipes 11 and 12 which are being joined together by means of a coupler which comprises a polyethylene member 21 and a laminar heater comprising a conductive polymer element 31. The member 21 is obtained by making a longitudinal cut in a length of a polyethylene pipe, the cut being angled so that the resulting cut edges 212 and 213 are chamfered so that they can slide over each other to increase or reduce the diameter of the coupler. The member 21 is flexible enough to permit such sliding motion, but not flexible enough to be opened up for use as a wrap-around coupler. The laminar heater is fused to the inside of the member 21 and one of the cut edges thereof. As best shown in the plan view of the "unrolled" coupler in FIG. 9, there are electrodes 33 and 34 secured to the surface of the heating element 31, and a center section has been removed from the heating element in the area of the heating element which covers the gap between the pipes; a conductive bridge 35 provides for current flow across the center section between the electrodes. The electrodes 33 and 34 and the center section 35 are shaped so that the current density is substantially the same throughout the heating element.

The ends of the pipes 11 and 12 are placed within the coupler, which is then reduced in diameter by means of metal bands 41 which are crimped around the coupler. The heater is then powered, thus fusing the coupler to the pipes and to itself.

If two pipes are coupled together in the way just described, but without removing the center section of the heater, then the expansion of the heated parts of the heater, closely confined as it is by the inflexible metal bands and the pipes, has a tendency to force the pipes apart.

FIG. 10 shows an articulated coupler which comprises a polyethylene member 21 and two laminar heaters comprising conductive polymer elements 311 and 312. The member 21 is obtained by making two longitudinal cuts in a length of a polyethylene pipe. One cut passes all the way through the pipe wall and produces edges 212 and 213 which are chamfered so that the cut edges can slide over each other to reduce the diameter of the coupler. The other cut, diametrically opposite the first, passes part way through the pipe wall, leaving a hinge section 214 which permits the member to be opened up so that it can be passed transversely over a pipe. The laminar heaters are secured to the inner faces and the cut edges of the member 21.

FIG. 11 is very similar to FIG. 10, except that both the longitudinal cuts pass all the way through the pipe wall, so that the coupler is in two separate parts.

FIGS. 12 and 13 show the use of the invention to repair a polyethylene pipe 11 (shown in part only) which has a hole 111 therein. A flexible repair patch comprises a polyethylene member 21 and a laminar heater comprising a conductive polymer element 31. The patch is placed on the pipe, over the hole, and secured there by an elastomeric band 42 (shown in part only) which passes around the pipe. The heater is then powered, fusing the patch to the pipe and sealing the hole.

FIGS. 14 and 15 show the use of the invention to secure a pressure access device to a telecommunications cable having an outer jacket 11 composed of polyethylene. A pressure access device 21 has a threaded hole 216 therein. A laminar heater comprising a conductive polymer element 31 is secured to the underside of the device. The device is placed against the cable and held in place by an elastomeric member 42 (shown in part only) which passes around the pipe. The heater is then powered, thus fusing the device to the cable. When access to the cable is desired, a hole is drilled through the jacket 11, using the threaded hole 216 as a guide.

FIG. 16 illustrates a typical conductive polymer tape according to the present invention wherein the tape 1 such as that made in Example 6 below, is printed with conductive ink electrodes 2 for good electrical contact with the conductive polymer and electrode (or buss) wires 3 are then placed on printed ink electrodes 2. Optional dielectric layer 4 may be laminated on the conductive polymer tape to assure good contact of the electrode wires 3 with the printed ink electrodes 2 and to provide dielectric installation for the electrodes 2 and to provide dielectric installation for the electrodes on the tape. As in Example 9 below, an additional optional polyethylene film may be laminated to the other side of the tape and the two films sealed along the edges to completely encapsulate the conductive polymer tape.

FIG. 17 illustrates an assembly for making a joint between polymeric pipes 21 and 22 using polymeric coupling 23. As in Example 7 below, the coupling 23 has grooves 24 cut in the interior surface thereof to form a recess for containing conductive polymer tape 1. Electrode wires 3 can extend from the conductive polymer tape 1 through the wall of coupling 23 at any desired point. In FIG. 17, the left hand side shows the assembly before powering the tape, and the right hand side shows the assembly after powering the conductive polymer tape and illustrates the typical melt pattern achieved in this type of joint.

FIG. 18 illustrates a butt type joint between polymeric pipes 31 and 32 wherein conductive polymer tape 1 is placed over seam 34 and compression means 33 which is a silicone elastomeric band is used to compress the tape against seam 34 to maintain good thermal contact and to hold pressure on the tape. When the conductive polymer tape expands upon heating, band 33 forces the molten conductive polymer joint into seam 34. FIG. 19 shows part of the butt joint after the tape has been powered and the compression means 33 has been removed.

FIG. 20 shows various uses for conductive polymer tape 20. A splice case 50 comprises half-shells surrounding cables 5. Cable jacket repair is shown at 51 as a simple wrap of the tape. A seal between a cable or pipe and a duct is shown at 52. A seal between a cable and a splice case end plate is shown at 53, and a seal between end plate halves is shown at 54. A longitudinal seal between the half-shells is shown at 55 and a seal between a cable and an end cap is shown at 56.

FIG. 21 illustrates another conductive polymer heating tape according to the present invention. It comprises a tape 1 composed of a sintered mixture of UHMWPE and carbon black (as prepared for example in Example 6 below). Openings 101 have been formed in the tape 1 and extend through a thickness thereof. The heating tape also comprises electrodes 2 and electrode (or buss) wires 3.

The invention is further illustrated by the following Examples.

EXAMPLE 1

A conductive polymer composition was prepared by dry blending in a high speed blender 95 parts by volume of ultra high molecular weight polyethylene powder, UHMWPE (Hostalen GUR-413, available from American Hoechst), having a molecular weight of about 4.0 million and an average particle size of about 0.1 mm, and 5 parts by volume of carbon black (Ketjenblack EC 300 DJ, available from Akzo Chemie). The mixture was extruded through a ram extruder heated to 170° C. at a rate of 5 feet/minute and a pressure of 3000 psi to produce a sintered rod 8 inches (20.3 cm) in diameter. The rod was skived to produce a flexible tape 0.030 inch (0.076 cm) thick and 4.0 inch (10.2 cm) wide.

A laminar heating element was prepared by attaching electrodes (buss wires) to the surface of the element. The electrodes were prepared by flattening 30 AWG silver-coated copper wire to give a cross-section 0.003 by 0.013 inch (0.008 by 0.033 cm), and then braiding 12 flattened wires together. Two electrodes were attached to one side of the element about 3.5 inches (8.9 cm) apart by means of a conductive adhesive comprising 89.5% by weight acrylic grafted polyolefin resin (Polybond 1016, available from Polymer Industries), 9.5% by weight carbon black (Ketjenblack EC 600, available from Akzo Chemie) and 1% by weight antioxidant. A narrow (0.25 inch/0.635 cm wide) strip of silver paint (Electrodag 504, available from Acheson Colloids) was painted the length of the element intermediate the two electrodes.

Two high density polyethylene pipes (Phillips 1000, available from Phillips) of 10 inch (25.4 cm) outer diameter and 0.75 inch (1.91 cm) wall thickness were connected in the way described above in connection with FIGS. 1 and 2. A polyethylene coupler with an outer diameter of 12 inch (30.5 cm) and a center wall thickness of 0.8 inch (2.03 cm) was cut to a length of 12 inches (30.5 cm) from a pipe of similar composition to those to be joined. The inner surface of each edge was machined to a taper of 6 degrees on the radius (12 degrees on the diameter). Visual indicator holes were drilled in a cone shape to a depth of 0.005 inch (0.012 cm) at intervals 0.5 inch (1.2 cm) from each edge of the coupler.

Two 34 by 4 by 0.25 inch (86.4 by 10.2 by 0.64 cm) pieces of polyethylene of a similar viscosity to the pipes to be joined were machined along one long edge to give a taper of 6 degrees, leaving wedge-shaped pieces with a minimum thickness of 0.066 inch (0.17 cm). A gasket was formed by folding a laminar resistive heating element onto each wedge with the silver paint strip adjacent the tip of the wedge. The ends of the two pipes were inserted into the coupler and moved adjacent to one another. One gasket was inserted at each end of the coupler. The gaskets were packed into the recesses between the coupler and the pipes to position and align the pipes and hold the join in place. A permanent join was made by powering the gasket at 100 volts AC for about 2 to 3 minutes or until a bondline temperature of 225° to 250° C. had been achieved and the pipe ends had melted and fused. When the pipes had been adequately fused, polymeric material from the pipes became evident in the visual indicator holes.

EXAMPLE 2

A conductive polymer rod was ram extruded as described in Example 1 and an element 36.5 by 6 by 0.03 inches (92.7 by 15.2 by 0.076 cm) was skived from it. Electrodes were attached 0.5 inch (1.3 cm) from each long edge and a broad strip of silver paint (1 by 34.5 inch/2.5 by 87.6 cm) was painted down the center of the element, starting at one end. This produced two 2-inch wide heating zones 34.5 by 2 inch, separated by a 1 inch "cold zone" and a terminal 5 by 2 inch (12.7 by 5.1 cm) heating zone at one end of the heating element. To improve the uniformity of heating, silver paint was sainted in a pattern which decreased the width of the terminal heating zone to 4 inches (10.2 cm).

A 6.75 inch-long (17.1 cm) coupler as shown in FIG. 8 was prepared. A polyethylene pipe which had a 10 inch (25.4 cm) inner diameter (ID) and a 12 inch (30.5 cm) outer diameter (OD) was cut through its thickness on a tangential line at the ID of the pipe which was perpendicular to a radial line through the pipe. The laminar heating element was secured to the coupler as follows. The heating element was placed around the inner diameter of the coupler with the terminal heating zone in the region of the cut through the coupler and with the ends of the electrodes protruding from the coupler; a pipe coated with PTFE was inserted into the coupler and the heating element was powered at 150 volts AC for 30 seconds; after cooling, the PTFE-coated pipe was removed.

Two 10-inch OD polyethylene pipes (0.75 inch/1.9 cm thick) were inserted into the coupler and clamps were attached on the outside of the coupler. The heating element was powered at 125 volts AC for 115 seconds to fuse the heating element to the pipes.

EXAMPLE 3

A heating element was prepared as in Example 2 except that it was cut into two pieces, one 20.5 inches (52.1 cm) long and the other 18.9 inches (48.0 cm) long. Each piece had an appropriate heating zone at one end.

The coupler as shown in FIG. 11 and 6.75 inch long was prepared by cutting a 12-inch OD pipe into two pieces using a cut as described in Example 2 and its mirror image. The heating element pieces were prefused to the inner diameter of each segment prior to fusing the heating element to two 10-inch OD polyethylene pipes.

EXAMPLE 4

A coupler as shown in FIG. 10 and 6.75 inch long was prepared as described in Example 2 except that a second tangential cut, of an angle corresponding to that of the first cut, was made into the coupler's inner diameter, but not all the way through the thickness of the coupler. As a result, the coupler could be opened to produce a segmented coupler with two shell-forming surfaces. Appropriately sized heating elements were fused to the inner surface of the coupler prior to making connection to two 10-inch OD polyethylene pipes.

EXAMPLE 5

A laminar heating element as described in Example 1 was prepared without the silver paint strip down the center. The element was fused to a 0.030 inch (0.076 cm) strip of high density polyethylene by powering the heating element while in contact with the polyethylene strip to produce a gasket. The gasket was used to connect two 10-inch OD polyethylene pipes by wrapping the gasket around the outer diameter of the pipes, applying clamping means around the gasket, and powering the heating element.

EXAMPLE 6

A conductive polymer tape was prepared by dry blending in a high speed blender 95 parts by volume of ultra high molecular weight polyethylene powder, UHMWPE, (Hostalen GUR-413, available from American Hoechst), having a molecular weight of about 4.0 million and an average particle size of about 0.1 mm, and 5 parts by volume of carbon black (Ketjenblack EC300 DJ, available from Akzo Chemie). The mixture was extruded through a ram extruder heated to 170° C. at a rate of 5 feet/minute and a pressure of 3000 psi to produce a sintered rod 8 inches (20.3 cm) in diameter. The rod was skived to produce a 0.015 inch by 0.875 inch (0.038 by 2.223 cm) tape.

Using a silver-filled ink (Electrodag 504, available from Acheson Colloids), two electrode strips each 0.1875 inch (0.476 cm) wide were painted on one side of the tape 0.5 inch (1.27 cm) apart. Electrode or buss wires were prepared by flattening 30 AWG silver-coated copper wire to give a cross-section 0.003 by 0.013 inch (0.008 by 0.033 cm), and then braiding 12 flattened wires together. Using a roll laminator operating at 1 ft/min (30.5 cm/min), the electrode/buss wires were laid onto the ink electrode strips and a 0.012 inch (0.030 cm) layer of clear polyethylene film was laminated on the top surface of the tape over the electrode strips and buss wires and a second layer was laminated on the bottom surface of the tape and heat sealed at the edges to produce a fully sealed and insulated conductive polymer tape. This tape can be cut to length and the top layer of polyethylene film peeled back from either end to expose the electrode wires for powering the tape.

EXAMPLE 7

Two plastic pipes were connected in the following way. A 3.5 inch (8.9 cm) diameter orange polyethylene coupler was injection molded. Two grooves 0.875 inch (2.223 cm) wide and 2 inches (5.08 cm) apart were machined on the inner circumference of the coupler. Two copper foil strips (each 0.002 by 0.188 inch/0.005 by 0.476 cm) with adhesive on one side to hold them in place in the grooves were placed in the grooves and the tape described in Example 1, but without the buss wires or the polyethylene film layers was placed on top of the copper strips so that the ink electrodes on the tape could contact the copper strips. Using a mandrel to hold the tape in place the tape was powered at 30 V/5.5 A for 1 minute to melt and bond the tape to the coupler.

To connect the coupler to a pipe, the pipe was inserted into the coupler and the tape powered at 30 V/5.5 A for 2 minutes. The melting of the tape to the pipe and the coupler was observed through a small hole drilled through the wall of the coupler over the tape. At the point of melting the color visible through the hole changed from black to orange. These conditions were sufficient to produce an excellent void-free bond. The expansion of the conductive polymer tape and the melting of the surfaces of the pipe and coupling produces the void-free bond.

What is claimed is:

1. An elongate article which is in the form of a tape, which is not heat-recoverable, and which comprises:
   (a) a conductive polymer element which
      (1) is in the form of a tape having a ratio of external surface area to polymer volume of at least 40 in$^2$/in$^3$, an average thickness of 0.01 to 0.05 inch, a ratio of width to thickness of at least 20, and a ratio of length to width of at least 3;
      (2) is composed of a conductive polymer which
         (i) comprises a sintered polymeric component which consists essentially of ultra high molecular weight polyethylene which has a molecular weight of at least about 1.5 million, and, distributed in the polymeric component, a conductive particulate filler which consists essentially of carbon black present in amount less than 9% by volume,
         (ii) increases in volume by at least 10% when it is heated from 23° C. to the melting point of at least part of the polymeric component, and
         (iii) has a resistivity of 23° C. of 0.5 to 10 ohm-cm and exhibits ZTC behavior in the temperature range from 23° C. to the melting point of at least part of the polymeric component; and
      (3) has been prepared by skiving a sintered rod produced by ram extruding a dry blend of the polymeric component and the conductive filler; and
   (b) elongated electrode which are placed at opposite edge portions of the conductive polymer element, which can be connected to a source of electrical power and which, when connected to a suitable source of power, cause current to flow through the conductive polymer element and to generate heat in a heated section thereof, substantially all of the current which flows through the heated section flowing parallel to the plane of the element, the heated section consisting essentially of the conductive polymer, and the heated section having an area of at least 4 inch$^2$.

2. An article according to claim 1 wherein the tape is capable of withstanding a watt density power load of at least about 50 watts/cm$^3$ for a period of time sufficient for the tape to heat itself to at least its melting point without damaging or degrading the polymer in the tape.

3. An article according to claim 2 wherein the power load is at least about 75 watts/cm$^3$.

4. An article according to claim 1 wherein the electrodes are positioned on the same surface of the conductive polymer element and are continuous.

5. An article according to claim 1 wherein said heated section of the conductive polymer element comprises openings which extend through the thickness thereof.

6. An article according to claim 1 wherein the element has a width of 1 to 3 cm and a length of at least 12 inches.

7. An article according to claim 1 which further includes an electrically insulating sheet of polyethylene which is secured to a face of the conductive polymer element, the other face of the conductive polymer element being exposed to the atmosphere.

8. An elongate article which is in the form of a tape, which is not heat-recoverable, and which comprises:
   (a) a conductive polymer element which
      (1) is in the form of a tape having a ratio of external surface area to polymer volume of at least 40 in$^2$/in$^3$, an average thickness of 0.01 to 0.05 inch, a ratio of width to thickness of at least 20, and a ratio of length to width of at least 3,
      (2) is composed of a conductive polymer which
         (i) comprises a sintered polymer component which is composed of ultra high molecular weight polyethylene which has a molecular weight of at least about 1.5 million, and, distributed in the polymeric component, a conductive particulate filler,
         (ii) increases in volume by at least 10% when it is heated from 23° C. to the melting point of at least part of the polymeric component, and
         (iii) has a resistivity of 23° C. of 0.5 to 10 ohm-cm and exhibits ZTC behavior in the temperature range from 23° C. to the melting point of at least part of the polymeric component; and
      (3) has been prepared by skiving a sintered rod produced by ram extruding a dry blend of the polymeric component and the conductive filler;
   (b) elongate electrode which are placed at opposite edge portions of the conductive polymer element, which can be connected to a source of electrical power and which, when connected to a suitable source of power, cause current to flow through the conductive polymer element and to generate heat in a heated section thereof, substantially all of the current which flows through the heated section flowing parallel to the plane of the element, the heated section consisting essentially of the conductive polymer, and the heated section having an area of at least 4 inch$^2$; and
   (c) a conductive bridge which lies between and is spaced apart from the electrodes, which is secured to a bridged section of the conductive polymer element, and which ensures that little or no heat is generated in the bridged section when heat is generated in the heated section.

9. An article according to claim 8 wherein the electrodes are positioned on the same surface of the conductive polymer element and are continuous.

10. An article according to claim 8 wherein the conductive particulate filler comprises carbon black and the conductive polymer has a resistivity at 23° C. of 1 to 10 ohm-cm.

11. An article according to claim 8 wherein the conductive bridge is in the form of a band which extends from one end of the conductive polymer element to the other end of the conductive polymer element, whereby there are two said heated sections of the conductive polymer element, one on each side of the conductive bridge.

12. An article according to claim 8 wherein the conductive bridge is in the form of a peninsula which extends from one end of the conductive polymer element and wherein the conductive bridge and the electrodes have shapes such that the current density is substantially the same at all locations on said heated section.

13. An article according to claim 8 wherein a part of the conductive bridge is not contacted by the conductive polymer element, thus providing a window to accommodate movement of the conductive polymer when it is heated by passing current therethrough.

* * * * *

UNITED STATES PATENT AND TRADEMARK OFFICE
CERTIFICATE OF CORRECTION

PATENT NO. : 5,286,952

INVENTOR(S) : McMills et al.

DATED : February 15, 1994

It is certified that error appears in the above-identified patent and that said Letters Patent is hereby corrected as shown below:

Cover Page [75 Inventors], delete "Hans Cordia, Pellenberg, Belgium; Johann D'Hondt, Hong Kong, Hong, Kong;" delete "Jeffrey A. Sampson, Redwood City, Calif.; Pradeep Barma, Fremont, Calif.; Barry Mathews, San Jose, Calif.; Robert Ritter, Fremont, Calif.; Julian S. Mullaney, Raleigh, N.C."

Cover Page [56 References Cited], Page 1, Foreign Patent Documents, add
--839,743      6/1960      United Kingdom
 1,605,005    12/1981      United Kingdom--

Column 1, line 32, replace "Barina" by --Barma--.

Column 1, lines 35 to 36, replace "continuation part" by --continuation-in-part--.

Column 2, line 38, replace "(KP1117)" by --(MP1117)--.

Column 2, line 44, replace "(KP1130)" by --(MP1130)--.

Column 2, line 44, replace "(HP1231)" by --(MP1231)--.

Column 3, line 17, replace "Carrying" by --carrying--.

UNITED STATES PATENT AND TRADEMARK OFFICE

CERTIFICATE OF CORRECTION

PATENT NO. : 5,286,952

INVENTOR(S) : McMills et al.

DATED : February 15, 1994

It is certified that error appears in the above-identified patent and that said Letters Patent is hereby corrected as shown below:

Column 5, line 34, replace "surfaces in" by --surfaces.-- and begin a new paragraph with --In--.

Column 6, line 60, replace "Electrodes" by --electrodes--.

Column 8, line 3, delete "and".

Column 9, line 55, replace "surfaces" by --surfaces)--.

Column 11, line 27, replace "leas" by --less--.

Column 11, line 44, replace "all" by --at--.

Column 11, line 64, replace "2500°C" by --250°C--.

Column 12, lines 16 to 17, replace "6 million other" by --6 million. Other--.

Column 12, line 30, replace "to-produce" by --to produce--.

Column 14, line 2, replace "A/$^{(Pxt)}$" by --(Pxt)/A--.

Column 15, line 54, After "part" replace "of" by --or--.

Column 16, line 64, replace "hells" by --help--.

UNITED STATES PATENT AND TRADEMARK OFFICE
CERTIFICATE OF CORRECTION

PATENT NO. : 5,286,952

INVENTOR(S) : McMills et al.

DATED : February 15, 1994

It is certified that error appears in the above-identified patent and that said Letters Patent is hereby corrected as shown below:

```
     Column 21, line 57, replace "user as" by --use, as--.
     Column 22, line 9, replace "FIG 9" by --FIG 10--.
     Column 22, line 27, replace "FIG 10" by --FIG 11--.
     Column 22, line 65, replace "FIGS. 11 and 12" by --FIGS. 12
and 13--.
     Column 23, line 9, replace "FIGS. 13 and 14" by --FIGS. 14
and 15--.
     Column 23, line 37, replace "Figures 1 show" by --FIGURE 1
shows--.
     Column 25, line 42, delete "to provide dielectric
installation for the electrodes 2 and".
     Column 25, line 43, replace "installation" by --insulation--.
     Column 25, line 44, replace "Example 9" by --Example 6--.
     Column 26, line 4, replace "tape 20." by --tape.--.
     Column 27, line 33, replace "sainted" by --painted--.
```

Signed and Sealed this

Eleventh Day of October, 1994

Attest:

BRUCE LEHMAN

*Attesting Officer*      *Commissioner of Patents and Trademarks*